Aug. 27, 1940.  C. H. NICKELL  2,212,503
AIR CONDITIONING SYSTEM FOR MOTOR VEHICLES
Filed June 26, 1937  18 Sheets-Sheet 1
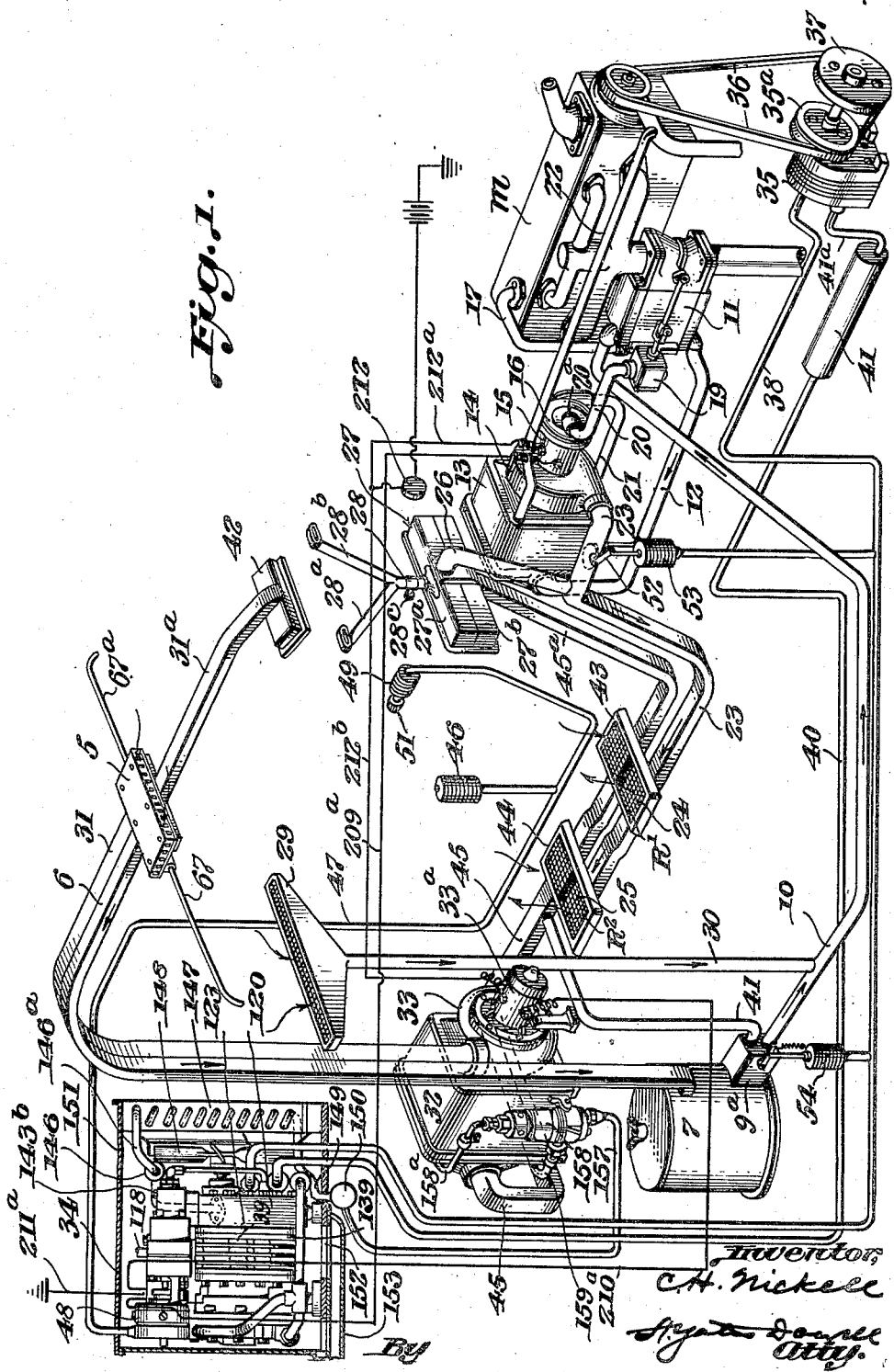

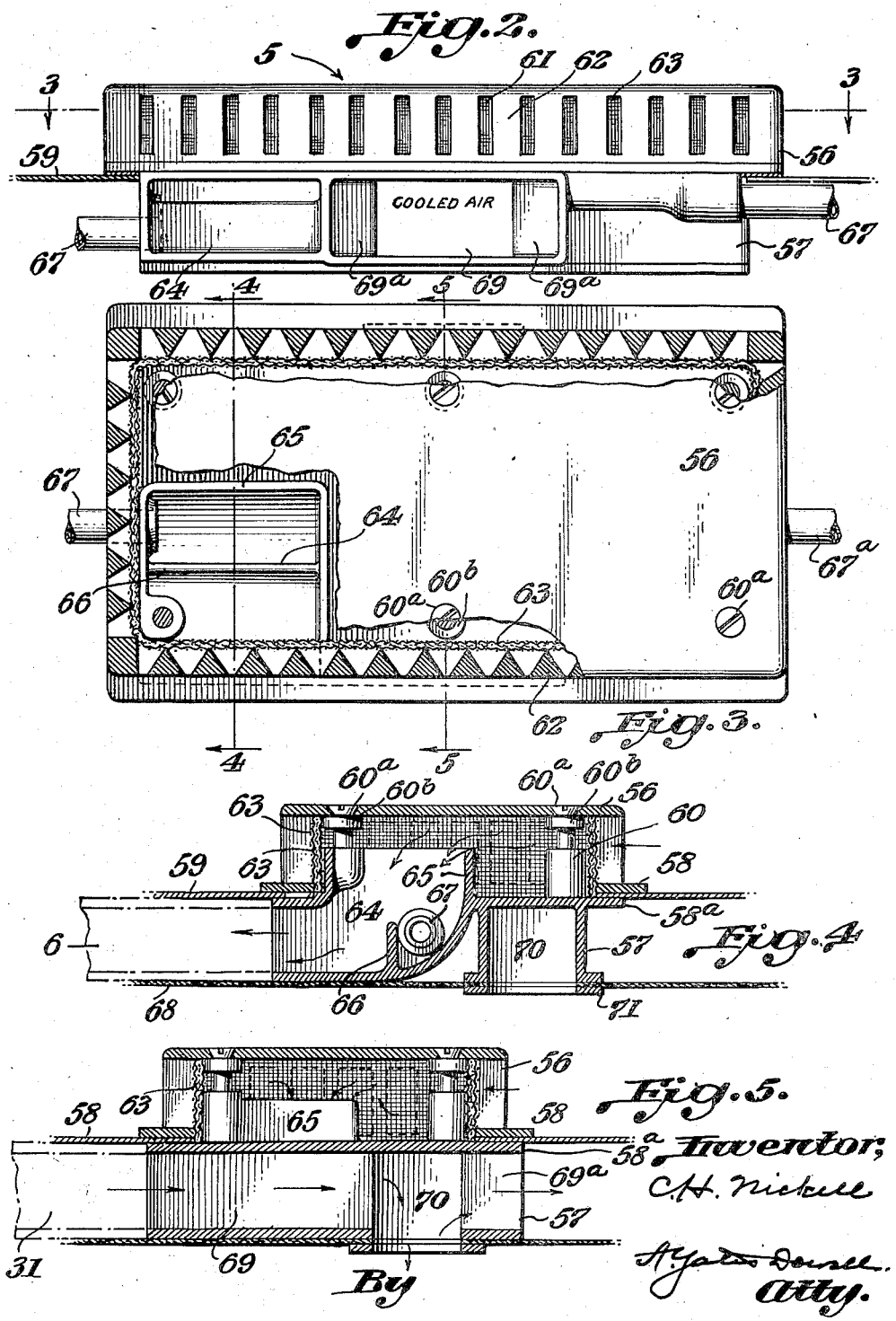

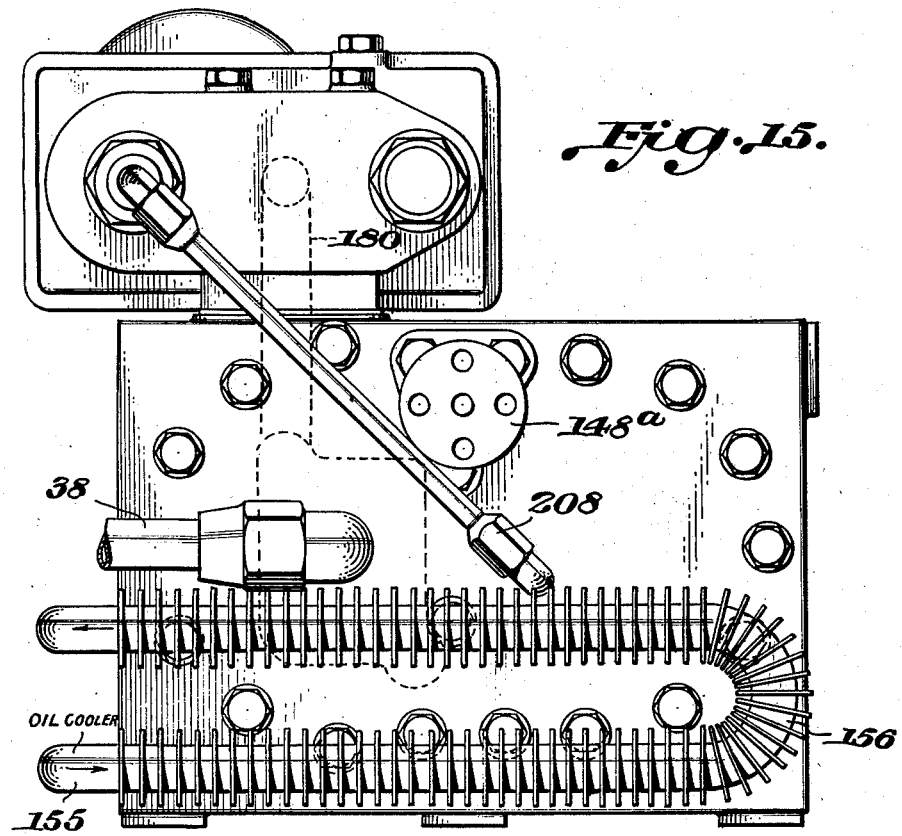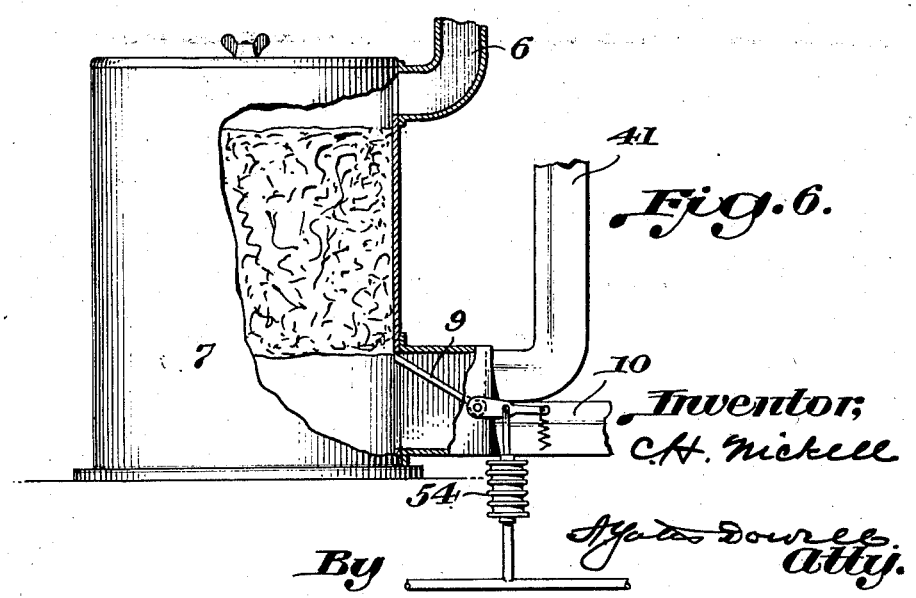

Aug. 27, 1940.  C. H. NICKELL  2,212,503
AIR CONDITIONING SYSTEM FOR MOTOR VEHICLES
Filed June 26, 1937   18 Sheets-Sheet 4
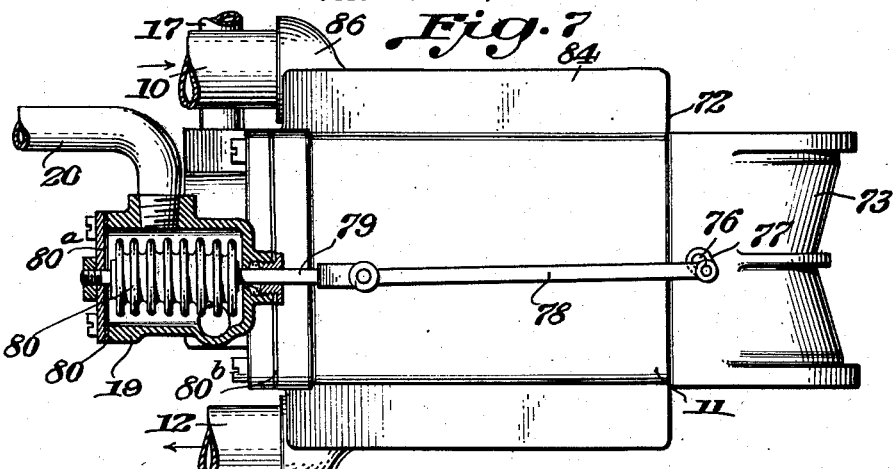
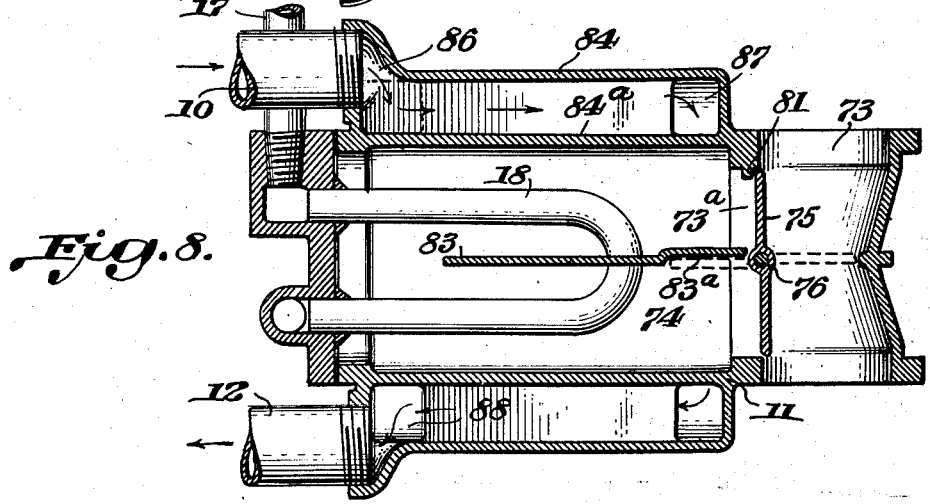
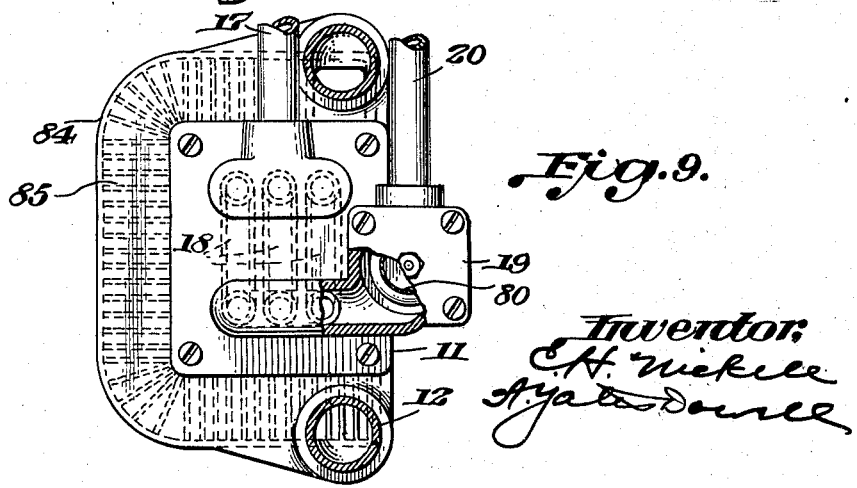

Aug. 27, 1940.  C. H. NICKELL  2,212,503
AIR CONDITIONING SYSTEM FOR MOTOR VEHICLES
Filed June 26, 1937  18 Sheets-Sheet 5
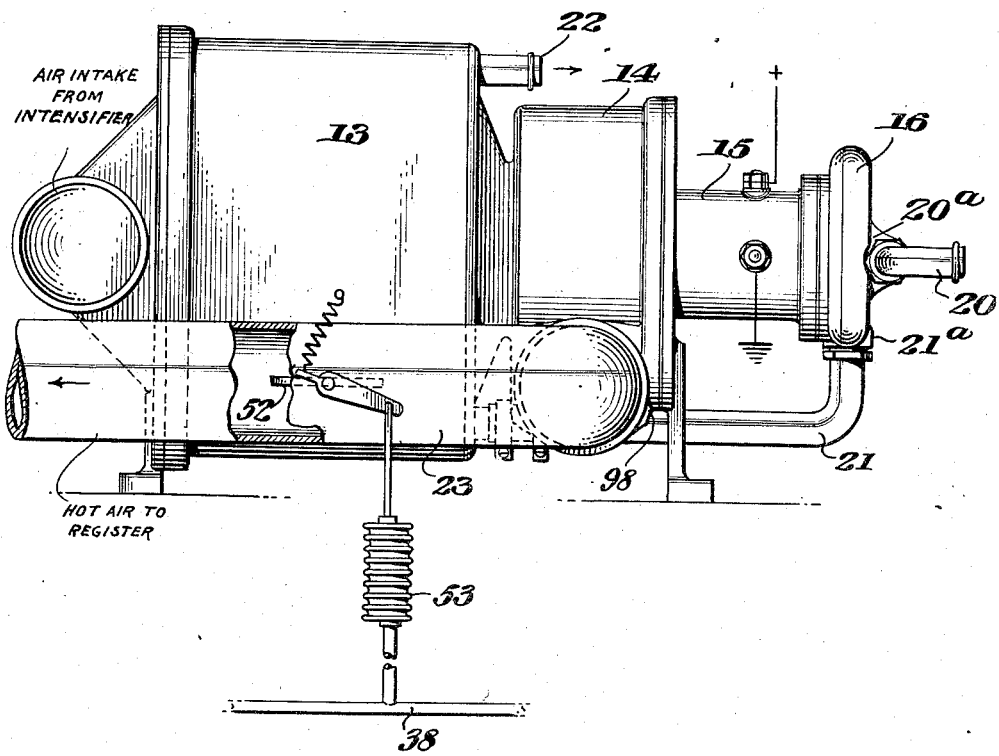
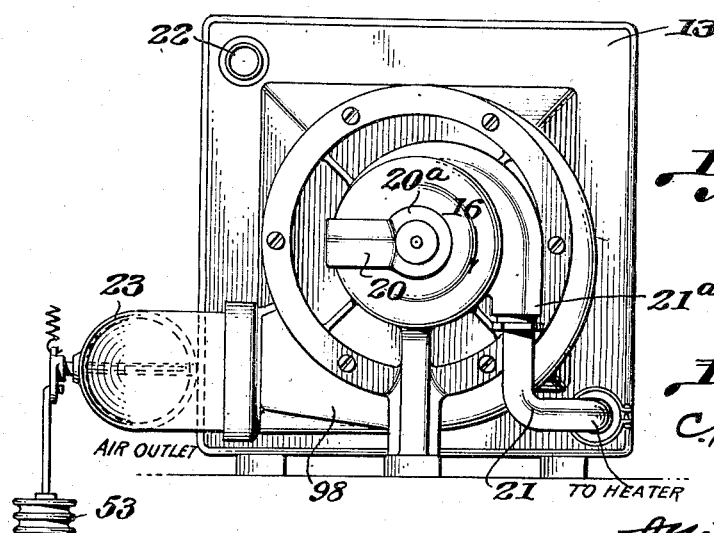

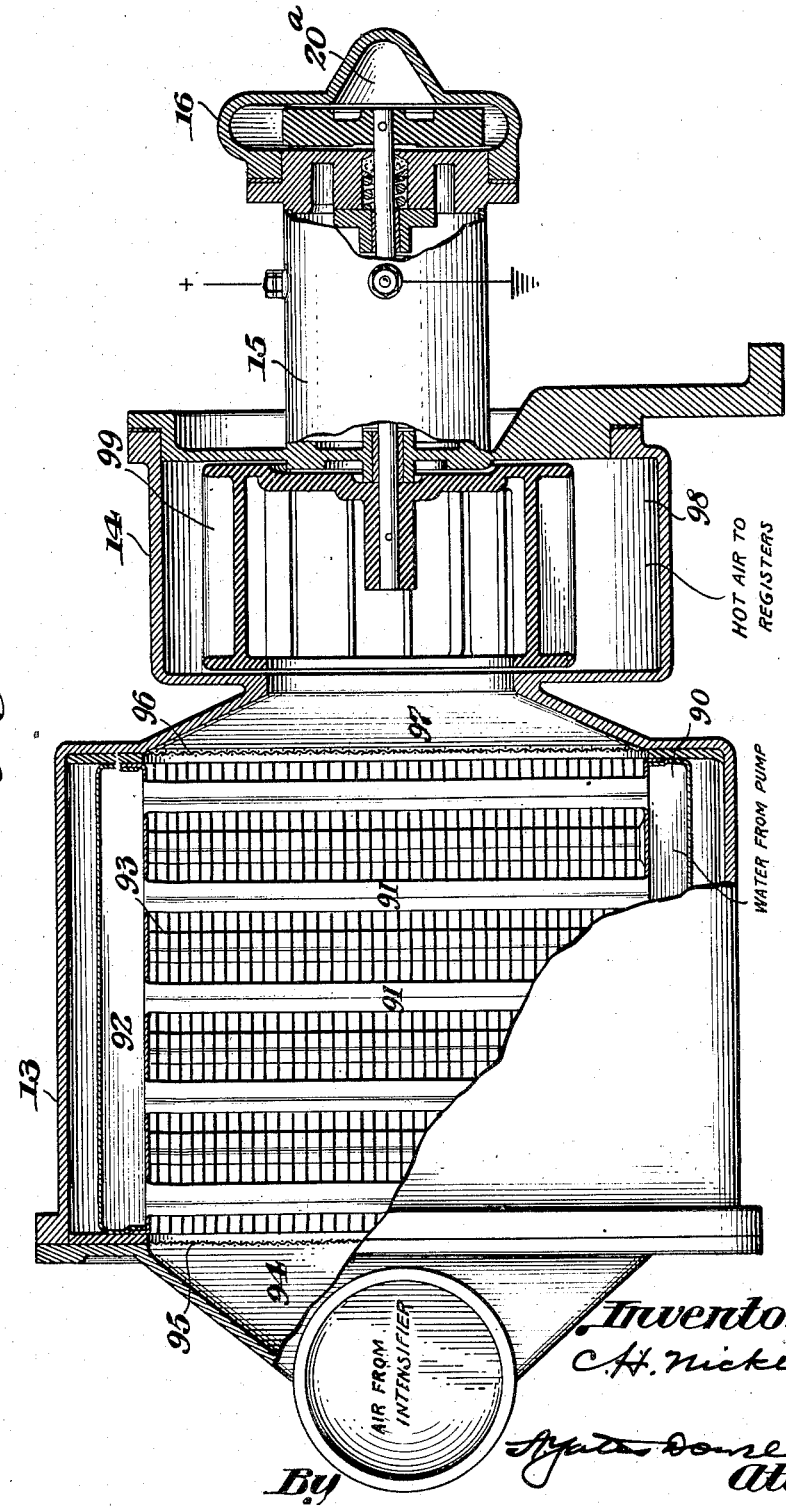

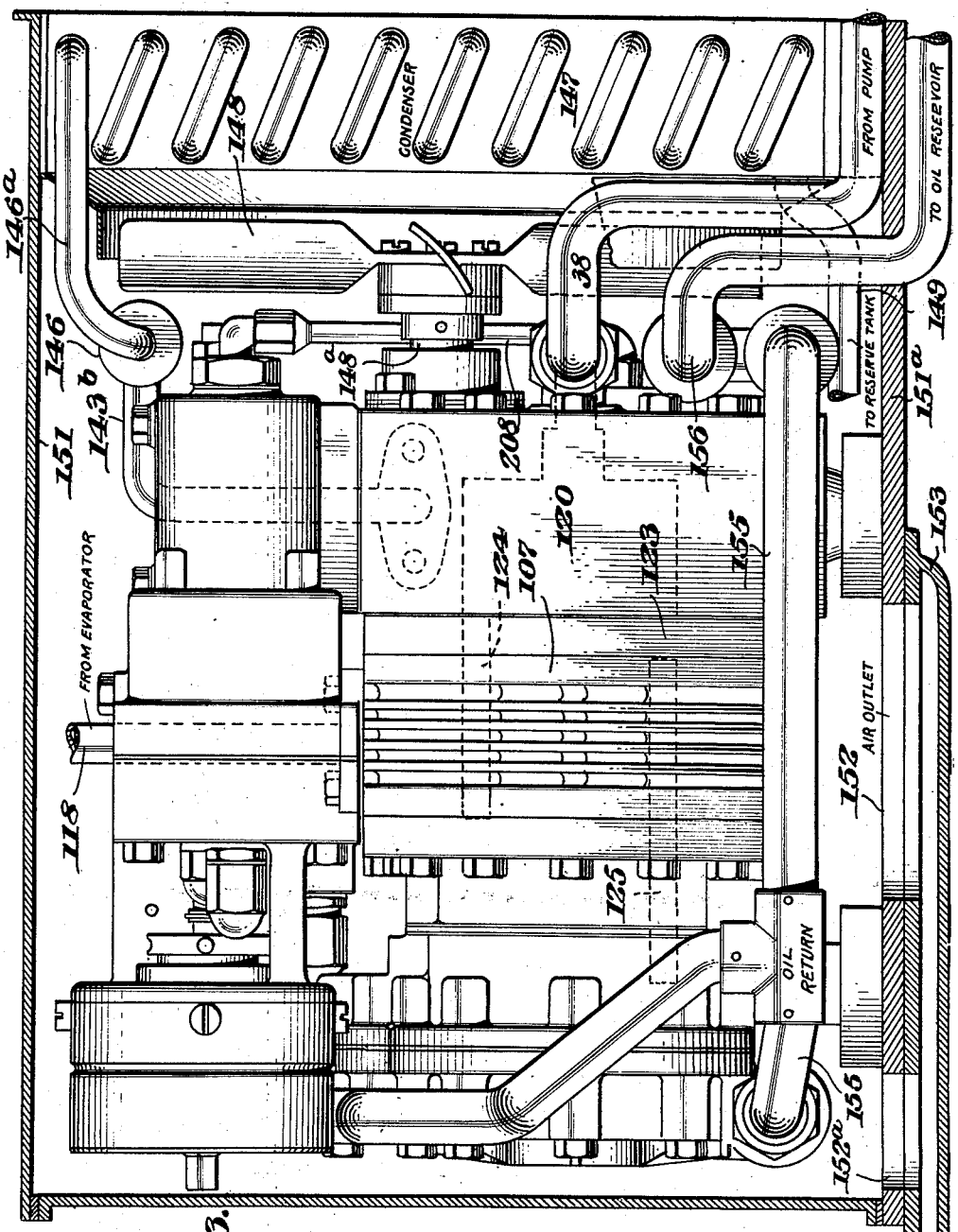

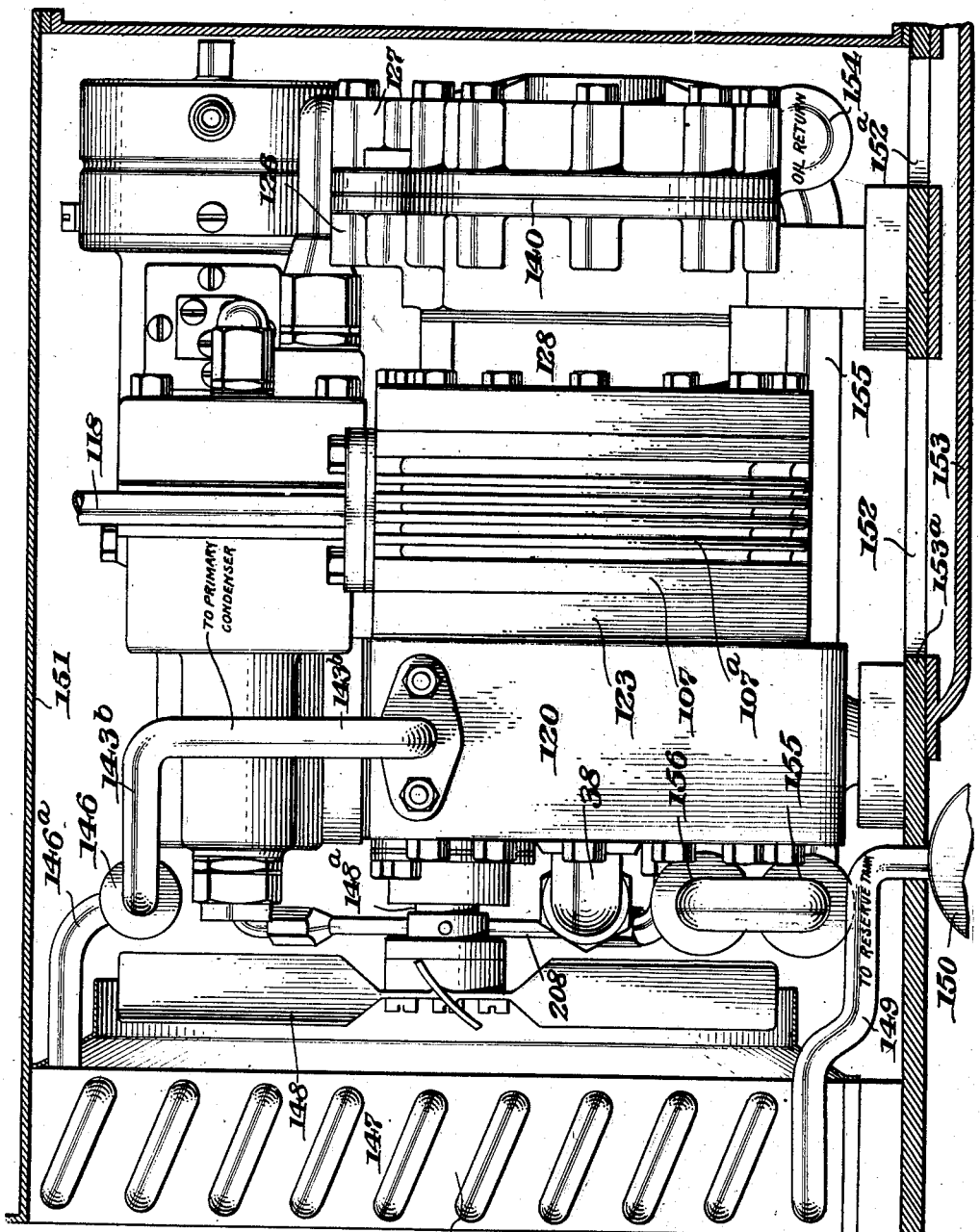

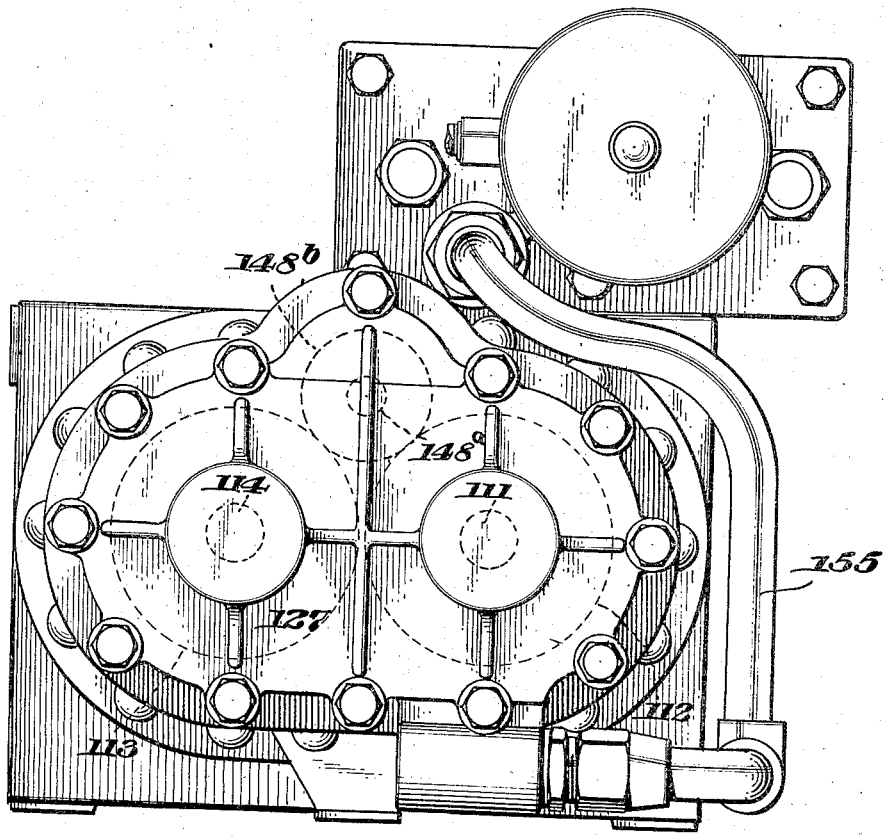

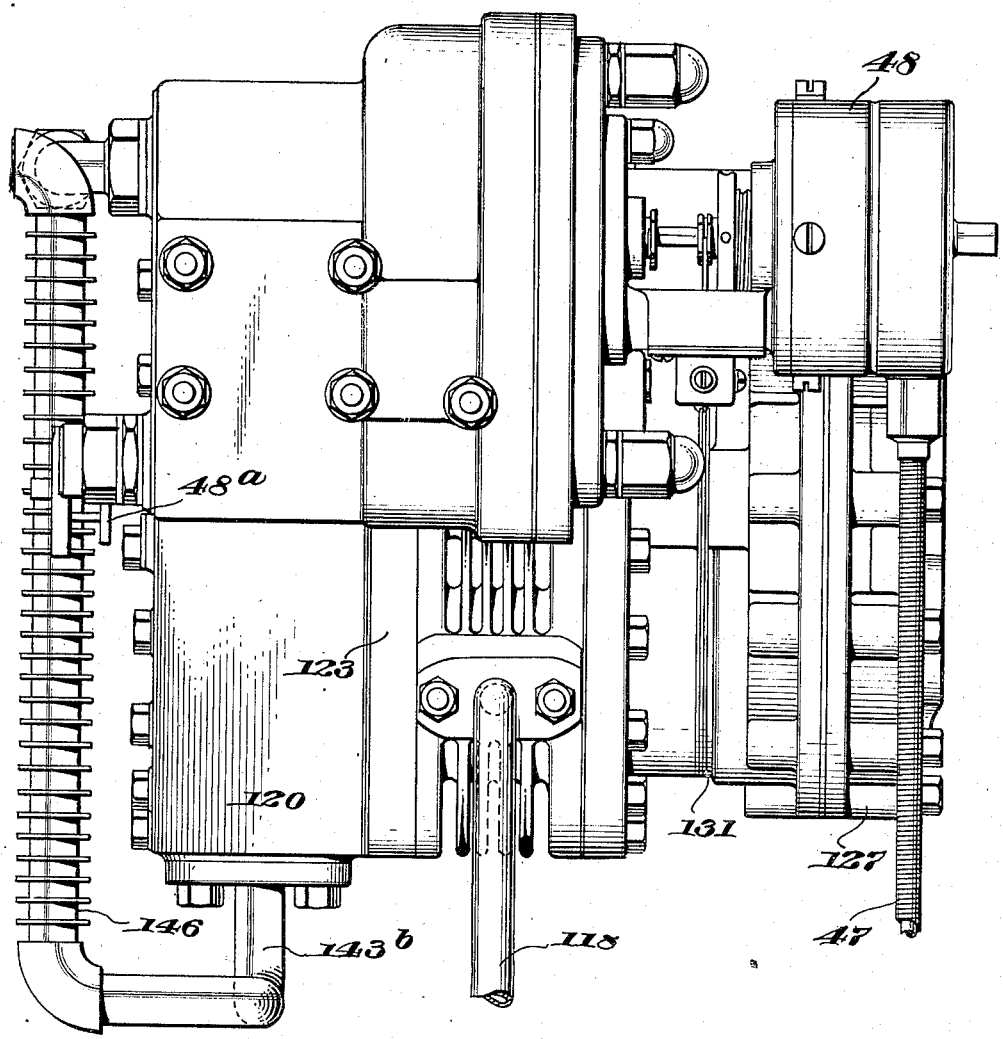

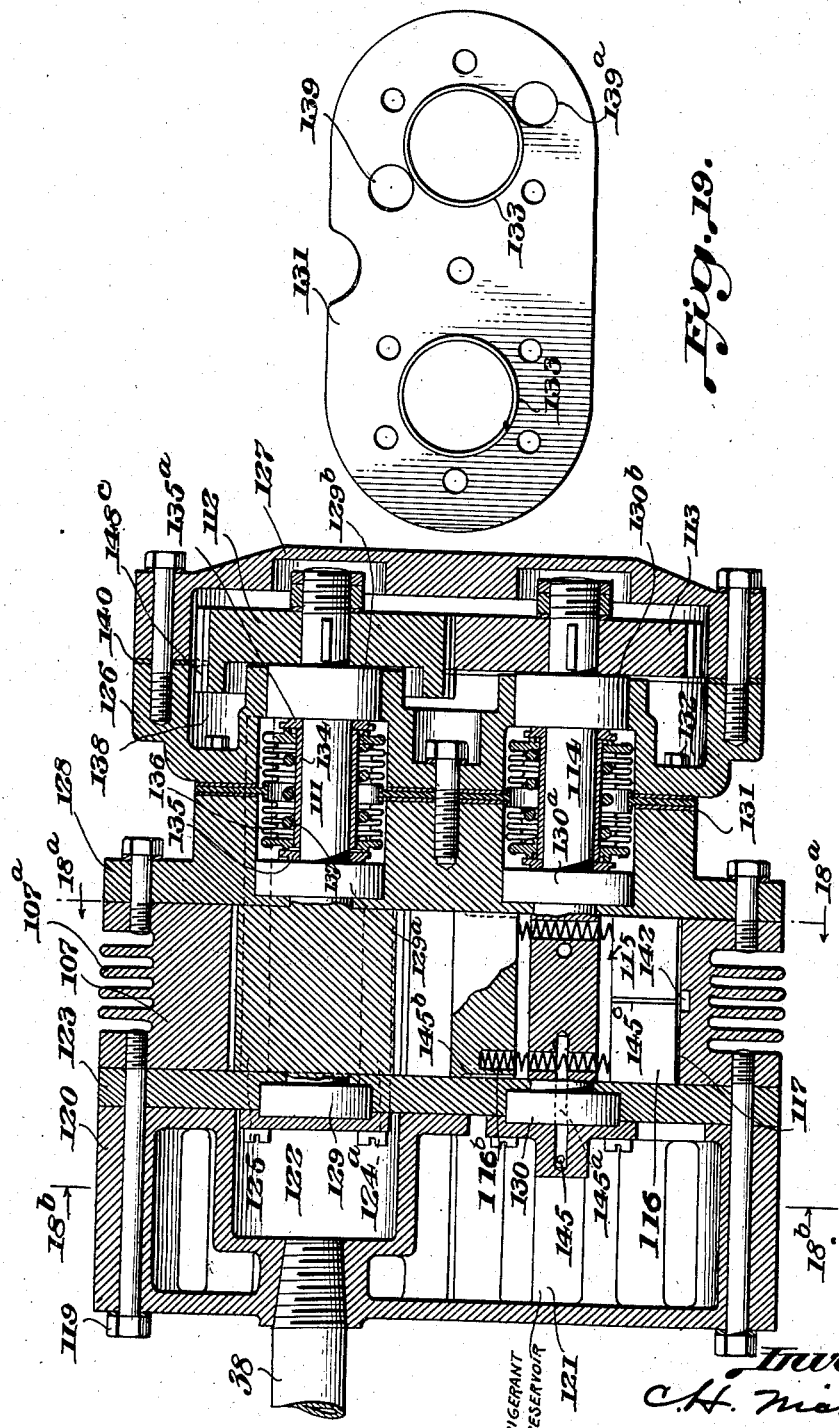

Aug. 27, 1940.　　　　C. H. NICKELL　　　　2,212,503
AIR CONDITIONING SYSTEM FOR MOTOR VEHICLES
Filed June 26, 1937　　18 Sheets-Sheet 12

Inventor,
C. H. Nickell
By　H. Yates Dowell
atty.

Aug. 27, 1940.   C. H. NICKELL   2,212,503
AIR CONDITIONING SYSTEM FOR MOTOR VEHICLES
Filed June 26, 1937   18 Sheets-Sheet 13

Inventor;
C. H. Nickell
By Hyatt Dowell
Atty.

Aug. 27, 1940.   C. H. NICKELL   2,212,503
AIR CONDITIONING SYSTEM FOR MOTOR VEHICLES
Filed June 26, 1937   18 Sheets-Sheet 15

Inventor:
C. H. Nickell
By J. Yates Dowell
Atty.

Aug. 27, 1940.   C. H. NICKELL   2,212,503
AIR CONDITIONING SYSTEM FOR MOTOR VEHICLES
Filed June 26, 1937   18 Sheets-Sheet 16

Inventor,
C. H. Nickell
By
Atty

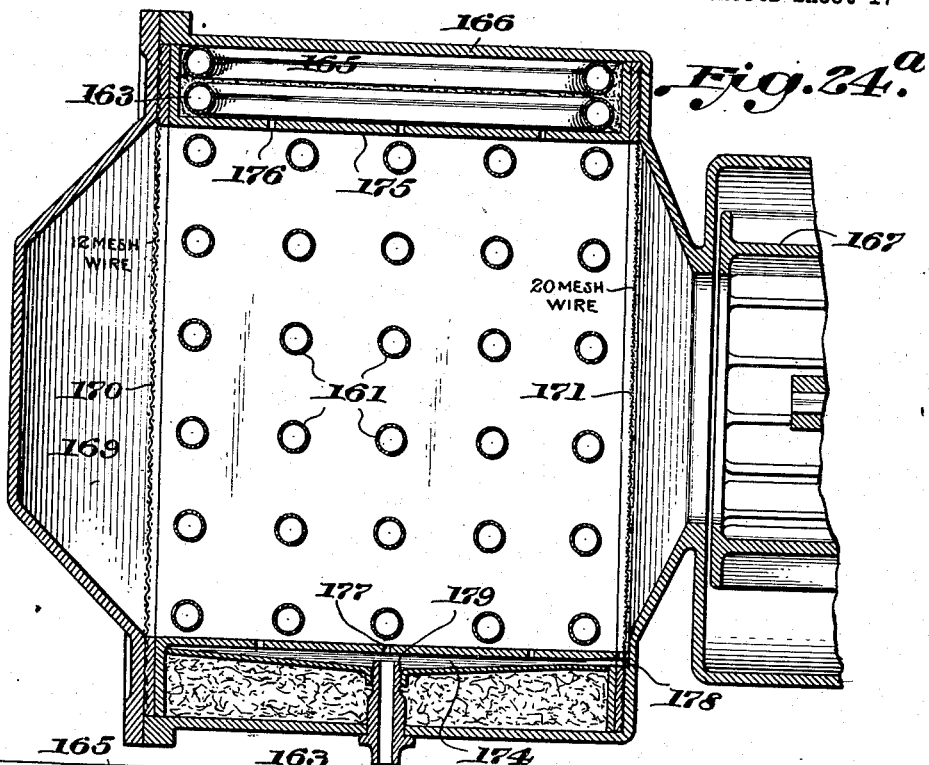
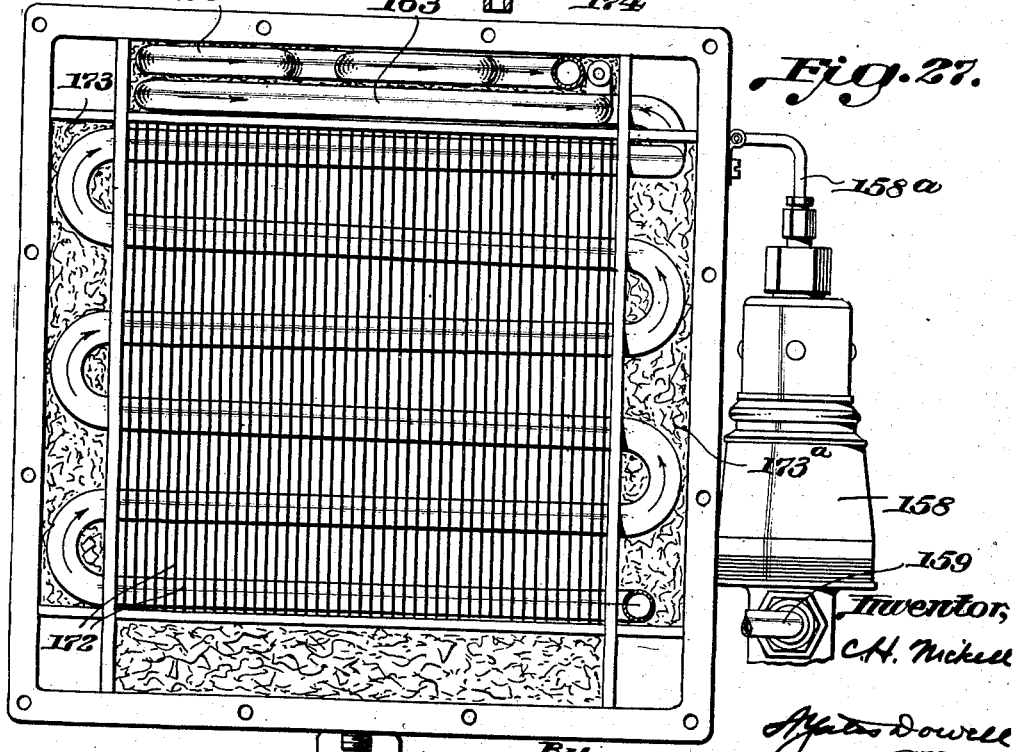

Aug. 27, 1940.　　　　C. H. NICKELL　　　　2,212,503
AIR CONDITIONING SYSTEM FOR MOTOR VEHICLES
Filed June 26, 1937　　　18 Sheets-Sheet 18

Inventor;
C. H. Nickell
By A. Yates Dowell
Atty.

Patented Aug. 27, 1940

2,212,503

UNITED STATES PATENT OFFICE 2,212,503

AIR CONDITIONING SYSTEM FOR MOTOR VEHICLES

Claude H. Nickell, New Castle, Ind.

Application June 26, 1937, Serial No. 150,645

10 Claims. (Cl. 257—3)

This invention relates to air conditioning systems broadly and particularly to the application and adaptation of such systems to motor vehicles.

Efficient air conditioning of automobiles, busses and like motor-driven vehicles involves problems separate and distinct from those confronting the designer of a system for buildings or like installations. A motor-driven vehicle is subject to constantly and sometimes rapidly changing weather conditions and air currents and pressures due to exposure to the elements and travel through different sections of the country and changes in speed and direction of travel; the units should be relatively light in weight, the installation space is limited so that the units must be compact, yet at the same time it is desirable that the system be efficient and capable of delivering the required volume of clean, heated or cooled air when called upon; the power consumption for the respective units should be kept at a minimum; there should be no unsightly exteriorly-visible parts, and other factors are involved which complicate matters.

The primary object of the prevent invention, therefore, is to provide an air conditioning system for motor vehicles which is capable of automatically delivering the required volume of properly conditioned air to suit the requirements of the occupant or occupants of a vehicle, is quickly responsive to changes in temperature beyond a predetermined range, will function efficiently despite the ever-changing conditions to which the vehicle is subjected, the units of which are sturdy yet compact and light in weight and low in power consumption, and which, in short, effectively meets and overcomes the foregoing problems.

The foregoing and other objects and advantages will become apparent in view of the following description taken in conjunction with the drawings, wherein:

Fig. 1 is a view in perspective and to some extent diagrammatic of the various coordinated heating and cooling units together with the connecting conduits therefor arranged for installation in operative relation with a motor vehicle;

Fig. 2 is a view in rear edge elevation of the intake register for the atmospheric air;

Fig. 3 is a view in section, partly in plan, taken substantially on the line 3—3, Fig. 2;

Figs. 4 and 5 are transverse sectional views taken substantially on the lines 4—4 and 5—5, Fig. 3;

Fig. 6 is a view in elevation, partly in section, of the air cleaner or filter and coacting control;

Fig. 7 is a view in side elevation, partly in section, of a heat intensifier forming part of the heating system;

Fig. 8 is a longitudinal sectional view of Fig. 7, and

Fig. 9 is a view in end elevation therof, parts being shown in section;

Fig. 10 is a side elevation of the heater blower unit;

Fig. 11 is an end elevation of Fig. 10, and

Fig. 12 is a view in sectional side elevation of the said heater-blower unit;

Fig. 13 is a view in side elevation, (right as viewed in Fig. 1) of the turbo-compressor-condenser unit with the casing or housing therefor shown in section;

Fig. 14 is a view in left side elevation of Fig. 13;

Fig. 15 is a view in front end elevation of the unit of Figs. 13 and 14;

Fig. 16 is a view in rear end elevation, and

Figure 18A:
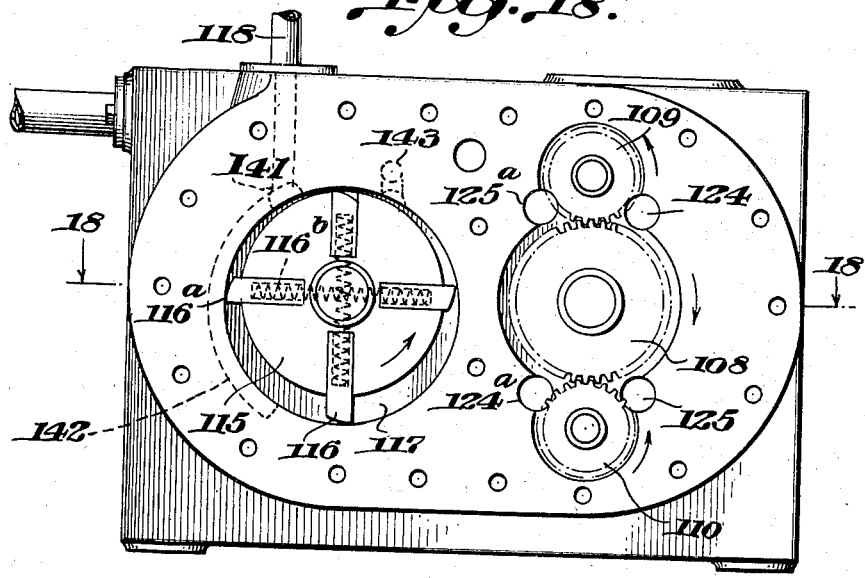
Figure 18B:
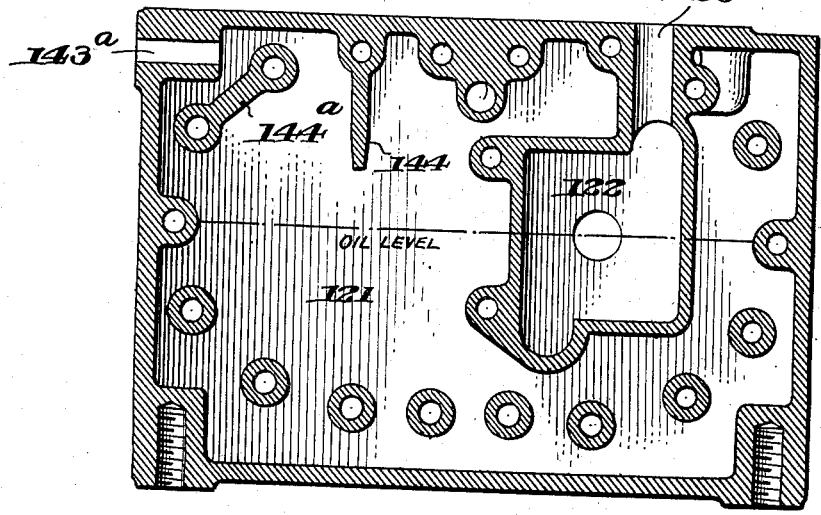

Fig. 17 is a top plan view of the said turbo-compressor-condenser unit;

Fig. 18 is a sectional view of the turbo-compressor taken on line 18—18, Fig. 18a;

Fig. 18a is a sectional view taken on line 18a—18a, Fig. 18;

Fig. 18b is a sectional view taken on line 18b—18b, Fig. 18, and

Figure 20:
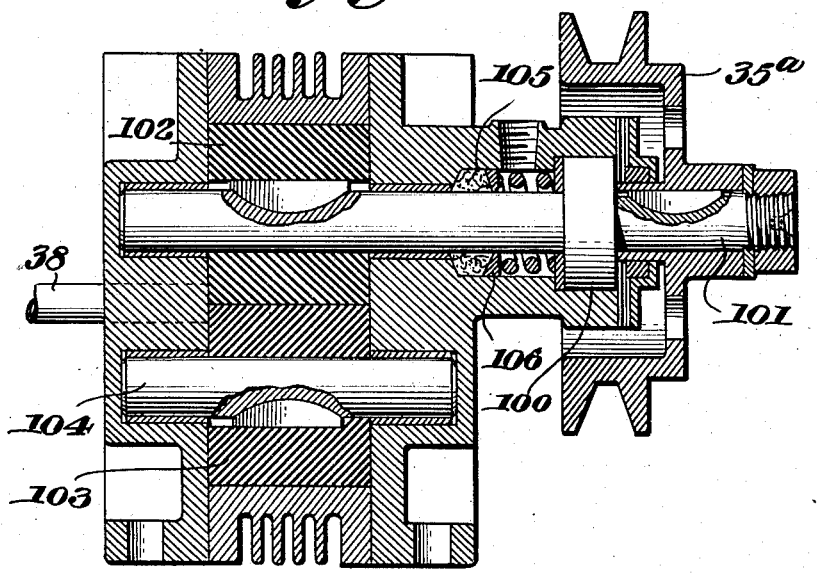
Figure 21:
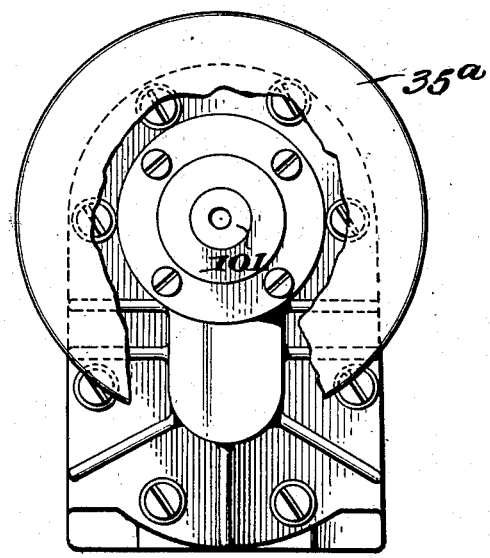
Figure 22:
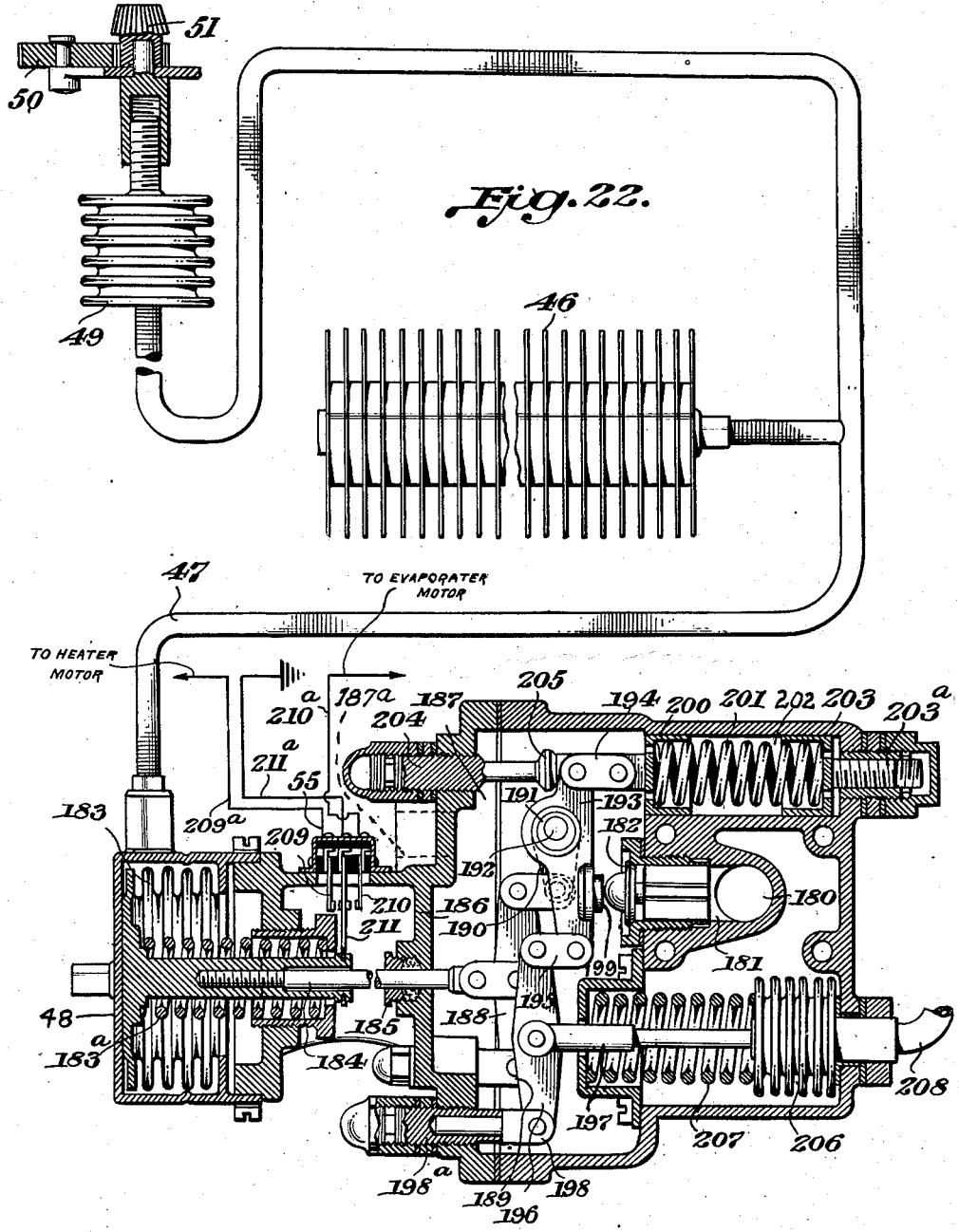
Figure 23:
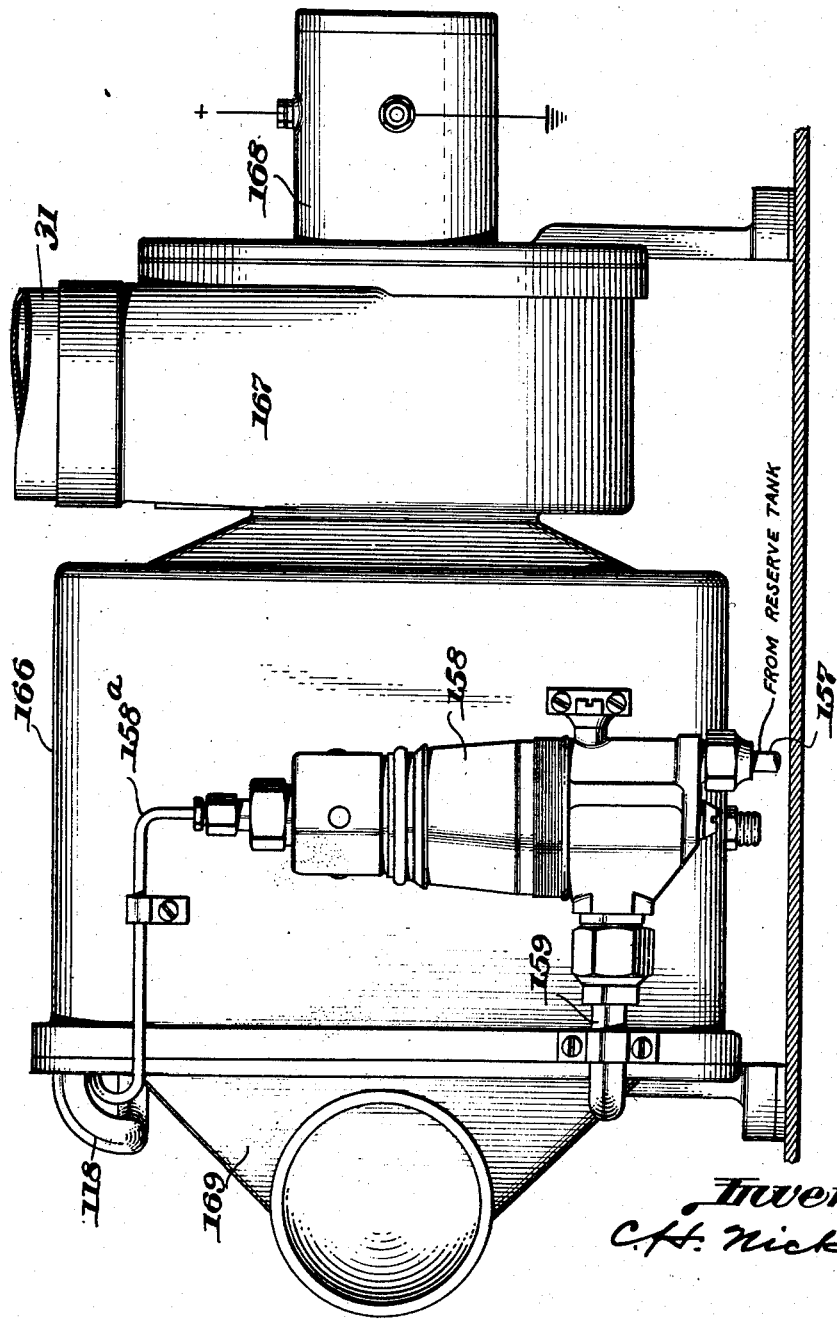
Figure 24:
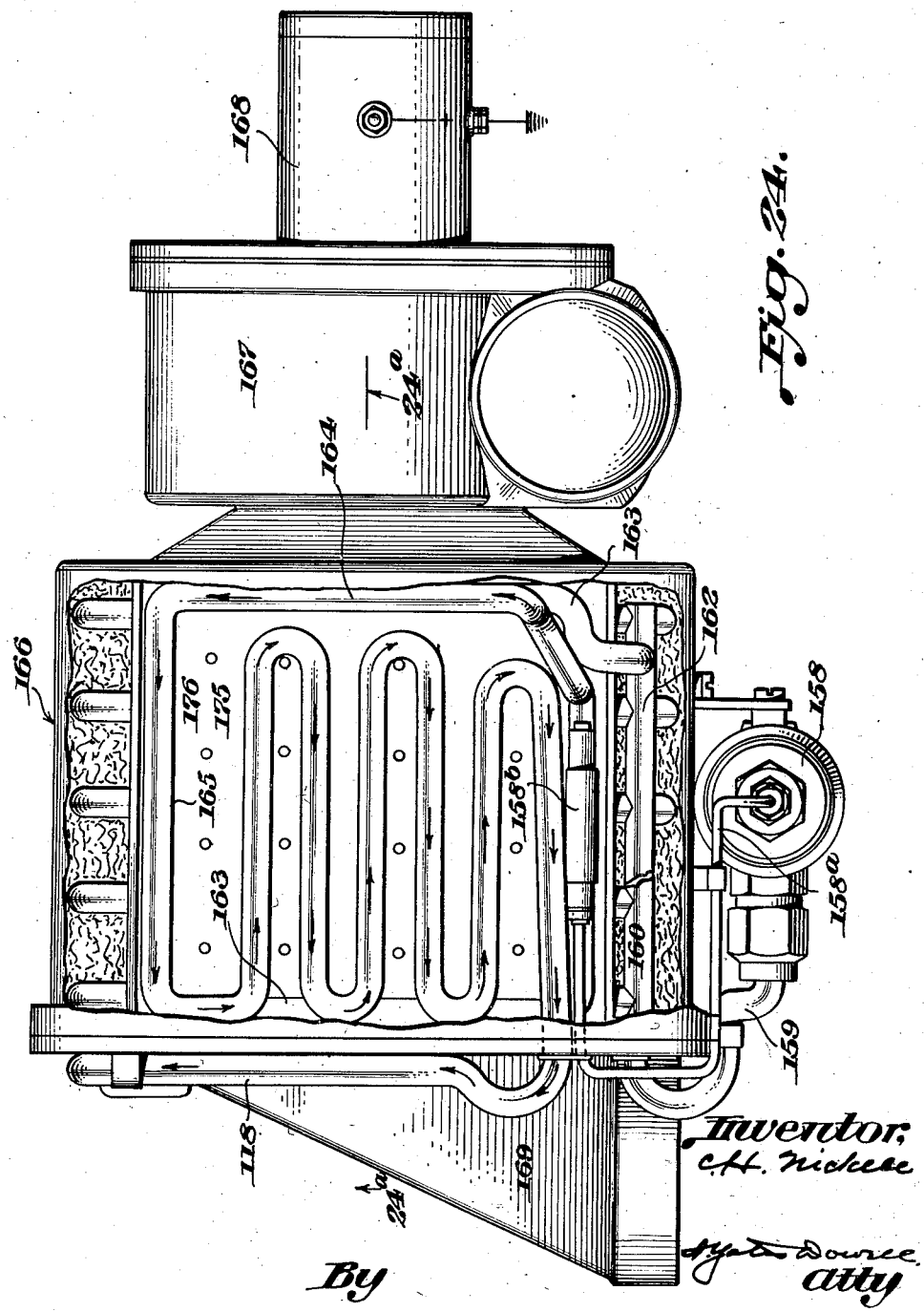
Figure 25:
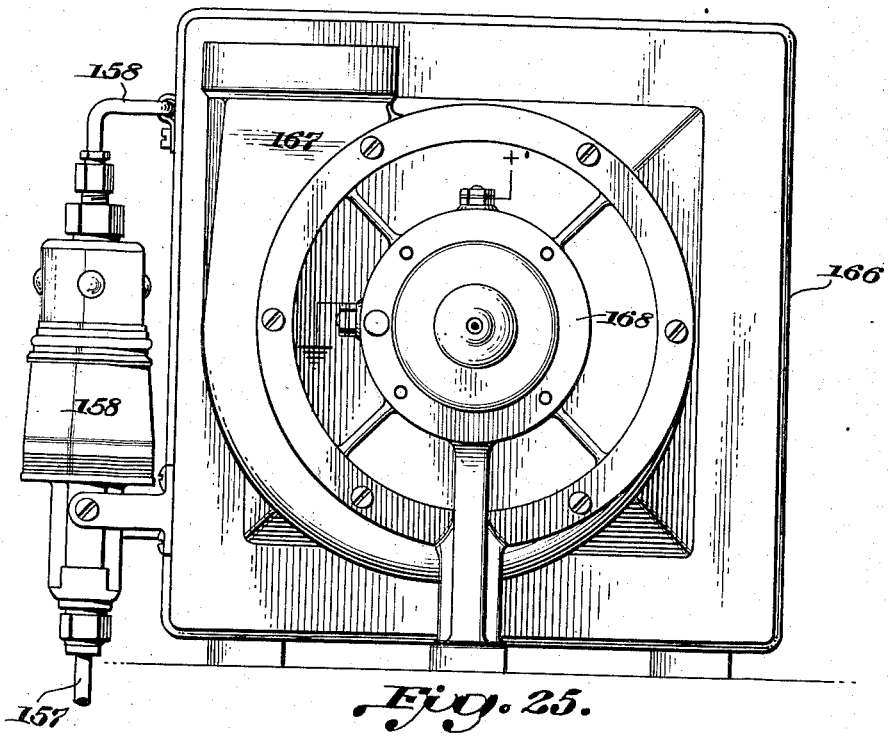
Figure 26:
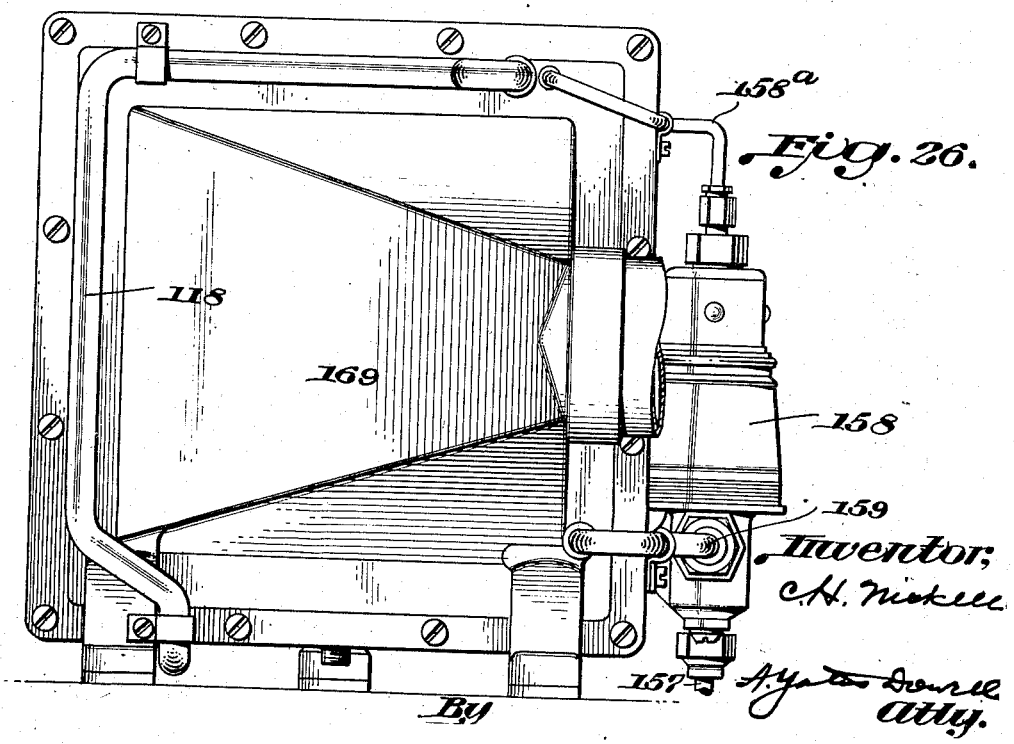

Fig. 19 is a view in elevation of a preferred type of seal plate used in the unit of Fig. 18;

Fig. 20 is a central sectional view of the fluid pump for the compressor turbine;

Fig. 21 is a view in front end elevation of the pump;

Fig. 22 is a cross section of the control unit for the compressor;

Fig. 23 is a view in side elevation (left as viewed in Fig. 1) of the evaporator and blower;

Fig. 24 is a plan view of the evaporator and blower with the top of the casing broken away to expose the evaporator chamber;

Fig. 24a is a view taken on the line 24a—24a, Fig. 24;

Fig. 25 is a view in front end elevation of the evaporator and blower;

Fig. 26 is a view in rear end elevation thereof, and

Fig. 27 is a view similar to Fig. 26, but with the end cover removed.

Referring now to Fig. 1, atmospheric or outside air is admitted into the body of the vehicle to which the system may be applied through an intake manifold or register generally indicated at 5, and connecting with this manifold is an intake conduit 6, the air flowing rearwardly and downwardly through conduit 6 into air cleaner or filter 7. From filter 7 the air may flow in either one of two directions, depending upon the position of control valve or gate 9, note particularly Fig. 6, the housing for which is indicated at 9a in Fig. 1. This valve or gate is designed to direct the incoming air into the cooling system when the latter requires same and only when the cooling system is in operation, in a manner which will subsequently be rendered apparent. In the position shown in Fig. 6, the gate valve 9 will direct the incoming air into the heating system through conduit 10, the air flowing in this conduit into a heat intensifier generally indicated at 11 and the particular construction of which will be described in connection with Figs. 7 to 9 inclusive.

It is preferred to so adjust the system that approximately seventy-five per cent of the air is recirculated and reconditioned and twenty-five per cent atmospheric or outside air is constantly being added to the system and conditioned. All of the circulated air is passed through the unit 11 when the cooling system is not in operation and circulates and is preheated therein and flows from the unit through conduit 12 to a main heater 13. The heater 13 forms part of a heater-blower-pump unit including a blower 14 driven by an electric motor 15, the latter also driving a water pump 16. The pump 16 controls circulation of water from the internal combustion engine M through pipe line 17 into an intensifier coil 18, (note Fig. 8), and from said coil into thermostat control unit 19, (note Fig. 7), and from this unit through pipe line 20 to circulator pump 16; then through pipe line 21 to the bottom of the core of heater 13, and after passing upwardly through said core, the water flows therefrom back to the main cooling system through pipe line 22, the latter being tapped into the suction conduit of the cooling system for the engine or car motor M.

Part of the air from the heater 13 is forced under pressure through hot air conduit 23 rearwardly and flows outwardly into the car body through hot air compartments 24 and 25 of floor registers R¹ and R².

As will be noted from Fig. 1, the hot air conduit 23 flares or increases in cross section from its point of intake at the blower 14 rearwardly to the point where it terminates at the outlet register R¹ and from this register it decreases in cross section to R², to thereby obtain an equalization or proportionate distribution of air with respect to the two registers. It will be also understood that the registers R¹ and R² may be of the adjustable type and completely closed or adjusted to any point desired.

A portion of the hot air also flows through conduit 26 to upper compartment 27a of outlet box or manifold 27, which may be positioned at the front of the automobile or similar vehicle below or adjacent the dash board. The hot air outlet 27 is preferably provided with a defrosting connection in the form of a tube or conduit 28 having branches 28a and 28b adapted to exhaust hot air adjacent the windshield of the vehicle and effect a defrosting action on the latter if desired, a valve 28c being provided for controlling admission of air to the defrosting conduit or tube 28.

The heated air passing into the vehicle body is exhausted or withdrawn from the latter through intake manifold 29, this manifold preferably being located at the rear of the vehicle, for example back of the rear seat, or at some out-of-the-way point but preferably towards the upper rear portion of the car body. In accordance with the adjustment heretofore noted, approximately seventy-five per cent of the air in the car body is drawn in through the manifold 29 and flows downwardly through conduit 30 into conduit 10, the remaining twenty-five per cent being exhausted from the car body across the condenser coils of the cooling system through a suction fan located beneath the condenser unit and under the floor of the car as will be hereinafter explained.

The cooling system includes cold air conduit 31 which substantially parallels conduit 6, conduit 31a leading to overhead outlet 42, evaporator-blower unit 32—33—33a (which is described and illustrated more or less in detail in connection with Figs. 23 to 27 inclusive), a turbo-compressor-condenser unit 34, (described and illustrated more or less in detail in connection with Figs. 13 to 19 inclusive), and other parts to be described in connection with the above figures. The drive for the compressor preferably comprises a pressure pump 35, which is provided with a drive pulley 35a having driving connection through belt 36 with pulley 37 on the crank shaft of vehicle engine or motor M. Any other suitable drive connection may be utilized. The pump 35 circulates fluid under pressure, such as oil or the like, through fluid line 38 to a turbine 39, from which the fluid returns through line 40 having an oil reservoir 41 therein.

As in the case of the heating or hot air system, substantially seventy-five per cent of the cooling air is recirculated while the remainder, or twenty-five per cent thereof, is indrawn through the intake manifold 5. The cold air however circulates in a direction opposite to that of the warm air. Atmospheric air entering the intake manifold or register 5 flows rearwardly and downwardly through conduit 6 into the air cleaner 7 and thence outwardly through gate valve housing 9a and into conduit 41, which is tapped into the cold air return conduit 45. The entire volume of conditioned and cooled air flows from evaporator 32 upwardly through conduits 31 and 31a and is exhausted or discharged into the car body partly through overhead manifold 5 and partly through manifold 42. From thence it circulates downwardly through the car body, part of the air being indrawn through intake compartment 27b of register 27 and the remainder dropping downwardly to the floor level and being indrawn into cold air intake manifold compartments 43 and 44 of registers R¹ and R², the cold air from compartment 27b returning through conduit 45a and merging with the air coming in through 43 and 44, the entire volume of air flowing through conduit 45 back to evaporator 32 to repeat the cycle. Register R¹, R² and 27 are preferably of the adjustable type.

The system functions automatically to cool or heat the air in accordance with a predetermined temperature range. Briefly, this operation is brought about by means of a master control unit shown in Fig. 22 and including an air coil or like control device 46 which controls the pressure in a pressure gauge line or tube 47 terminating in the pressure chamber of a Sylphon bellows, the housing for which is generally indicated at 48 in Fig. 1, and which acts through a system of compounding levers on a by-pass unloader for the compressor, as will be subsequently more fully described in connection with said figure. A temperature range selector in the form of a pressure bellows 49 is mounted adjacent the panel board 50 and is adjustable by a knob 51. By adjusting knob 51, the pressure bellows 49 is contracted or expanded to thereby increase or decrease the pressure in line 47.

Means are also provided whereby when the cooling system is automatically cut in by the action of the air coil 46 and slyphon bellows 48, the hot air system is cut out and the incoming atmospheric air is cut into the cooling system. This is accomplished by means of a gate valve 52 which is mounted in the outlet conduit from the blower 14 and is controlled by means of a pressure bellows 53 which connects into the pressure line 38 from the compressor pump 35. Also connected into this same line is a pressure bellows 54 which acts on the gate valve 9. Thus when the compressor starts in operation and the pressure builds up in fluid or oil line 38, the valve 52 closes off all flow of warm air from the heating system into the conduits 26 and 23 and the gate valve 9 is thrown to a position opposite that shown in Fig. 6, and the cold air system commences to function in the manner above described. Simultaneous with this operation, a switch 55, note Fig. 22, makes contact and grounds the electric motor 33a for the blower 33 and the latter is started in operation. Switch 55 is so arranged that previous to this and within a range of 20°, for example, the motor 15 for the blower 14 has been cut out of operation. The switch 55 is coordinated with the master control unit to effect the foregoing operations, as will be more fully described in connection with Fig. 22.

There is also an overload pressure release take-off from the refrigerant oil reservoir of the compressor, the operation of which will also be more fully brought out in connection with the description of the master control unit.

The efficient functioning of the system depends primarily upon the particular construction of the units comprised in the system, and these units will now be described.

*Atmospheric or fresh air intake register*

The intake register 5 is shown more or less in detail in Figs. 2 to 5 inclusive, and referring to these figures it will be noted that the register comprises upper and lower parts or sections 56 and 57, the two parts constituting the complete manifold housing or casing. These parts 56 and 57 may be aluminum castings, sheet metal stampings, or other suitable, preferably light, material and are provided with coacting edge flanges 58 and 58a. The top wall 59 of the vehicle body, which is generally of sheet metal in modern construction, may be cut out or stamped with a suitable opening and the lower section 57 inserted therein and the two parts brought into clamping engagement by means of interiorly threaded bosses 60 formed on the lower section and coacting screw studs 60a which are countersunk in bosses 60b formed in the top section. The top section has formed in the side walls thereof air inlets 61 which are separated by fins or partitions 62, preferably of V-shape contour, note particularly Fig. 3. These openings or inlets 61 are preferably relatively calibrated or metered so as to admit a predetermined amount of air into the front and/or sides of the manifold with respect to the air exhausted from the rear of the manifold. In other words, it is preferred to meter the openings 61 so that approximately twenty-five per cent more air enters the register than is allowed to be drawn or exhausted from the rear thereof through movement of the car. There are certain advantages brought about by this construction which bear materially on the efficiency of the system. To explain briefly, it is highly advantageous that there be a given amount of free or undisturbed air in the register chamber responsive to the system at all times, regardless of the speed at which the vehicle may be driven. At high speeds, a relatively high head pressure is produced at the front of this intake manifold and a high vacuum at the rear, while at the same time the system requires a constant supply of air regardless of the speed of the car. Unless there is always a certain volume or supply ready at hand in the register, the system either becomes overloaded with new air, or too much warm or cold atmospheric air, or suffers from lack of new air. By metering the intake and exhaust openings on a certain predetermined ratio, for example such as that above noted, more air enters the register than is exhausted from the rear thereof, thereby maintaining a constant, undisturbed supply in the manifold chamber.

An air filter or screen 63 is disposed or clamped against the inner edges of the partitions or fins 62 around the register chamber; this filter being of such construction as to prevent entrance of dust, dirt and other particles. The filter or screen may be readily removed and cleaned and may also be treated in any suitable manner to more effectively serve its filtering function, particularly in extremely dusty areas or sections. The lower section 57 is formed with an atmospheric air intake conduit 64, which connects with conduit 6, the wall of which projects upwardly a certain distance into the upper register chamber to provide a baffle as at 65, note particularly Fig. 5. An upwardly projecting rib or partition 66 is formed on the bottom wall of the intake conduit 64, providing a transversely extending drain conduit which has connected thereto drain pipe 67, the latter leading to one side of the body between the sheet metal top 59 and the cloth liner 68. At the opposite side of the register a similar drain pipe 67a is provided which serves to drain off any moisture or water collecting in the main chamber of the register. The lower section 57 is also provided with a through conduit 69—69a which connects rear and front with conduits 31 and 31a, respectively. Between the conduits 69 and 69a a downwardly opening and laterally extending cooled air outlet 70 is provided. Passage 69 is partitioned off from the register chamber and inlet passage 64. The lower part 57 of the register may be provided with a flange 71 adapted to engage the cloth top 68.

The arrows in the respective figures show the path of the incoming atmospheric air and the travel of the cooled and conditioned air. Any moisture drawn in through the filter or screen 63 will strike the wall 65 and drop down on to the floor of the register chamber and flow outwardly through the drain pipe 67a. The upwardly projecting rib or baffle 66 also serves to trap any moisture that may pass over wall 65 and gather in the said passage 64, the water flowing outwardly through the drain pipe 67. Conditional and cooled air flows through conduit 31a into through-passage 69, part thereof passing on through conduit 31a and then out through overhead outlet register 42 and part through the opening 70. Due to the restricted character of the passage 69 adjacent the outlet 70, an equalized outflow of air takes place through said outlet and the register 42.

Intensifier-main heater combination

As heretofore noted, means are provided whereby a highly efficient heating action is obtained which is under automatic control at all times. This action is brought about by the particular construction of the intensifier-main heater combination shown in Figs. 7 to 12 inclusive, the intensifier being shown in Figs. 7 to 9 inclusive. Referring to these latter figures, the intensifier body may be in the form of a casting generally indicated at 72 and is provided with an exhaust conduit 73 which is adapted to be inserted between the exhaust manifold and the exhaust pipe of the vehicle engine or motor, note Fig. 1. The hot water heating coil 18, heretofore referred to, is positioned in an interior heating chamber 73a, the latter communicating with the chamber 73 through passage 73a having a gate valve 75 rotatably mounted therein. The oppositely extending closure members or gates of valve 75 are mounted on a shaft 76, and this shaft projects through the wall of the chamber 73 and has mounted on the end thereof a crank 77, the latter connecting through link 78 with plunger rod 79 of a thermo-responsive expansible and contractible thermostatic unit 80 mounted in the housing 19. The heated water in the coil 18 flows out through housing 19, and the temperature of this water acts upon the thermostat 80 to expand or contract the latter which in turn either pulls or pushes on the link 78 and rod 79 and through the crank 77 rotates the shaft 76 and valve 75 to open, closed or an intermediate position, the closed position of said valve being limited by a stop member 81, note Fig. 8. A heat equalizing fin 83 is provided in the chamber 74, and the extremity of said fin adjacent the valve is formed with an offset portion 83a in which the lower gate of the valve 75 fits when the latter is fully open, thereby directing the exhaust gases from the vehicle engine either partially or fully into chamber 74, depending upon thermostat unit 80.

The intensifier is formed with an outer jacket 84, the wall of which is spaced from the inner wall 84a, and between these walls are a plurality of radial heat-conducting fins 85. Air from the conduit 10 flows into intake passage 86 and on through to the annular chamber 87, at which point it is diffused around the ends of the radial fins and then flows back between the latter into chamber 88 and thence into exhaust or suction conduit 12.

This combined hot air-hot water type of heat intensifier provides an almost instant response when the vehicle engine or motor is started. The water remaining in the coil 18 after the motor is stopped maintains the heating chamber at a heating temperature over a relative long period of time. Thermostat 80 automatically controls the opening action of gate valve 75 in accordance with the temperature of the water flowing through coil 18. Thus when the vehicle engine is first started, valve 75 will be fully closed (dotted line position) to compensate for lack of heat in coil 8, giving a quick response from the intensifier. Furthermore, the water flowing through coil 18 is preheated preparatory to being introduced into main heater.

Thermostat unit 80 is purposely provided with metallic heat-conducting gasket 80a and 80b of relatively high heat conductivity so as to be quickly responsive to the air flowing through the intensifier. By this means the intensifier serves to regulate itself even though the air and water circulating motor 15 is cut out.

Figs. 10, 11 and 12 illustrate a preferred type of main heater. Water taken from the top of the cylinder head flows to intensifier through conduit 17 and from the intensifier is drawn through conduit 20 into chamber 20a of pump 16 and thence outwardly through outlet 21a into and through conduit 21 into bottom chamber 90 of heater 13, from which it is forced upwardly through passages 91 into top outlet chamber 92 and out through return pipe 22 to the suction side of the main cooling system of vehicle engine. As the hot water flows or builds upwardly through conduits 91, it heats the finned radiator structure 93.

Air from the intensifier flows into the heater chamber through conduit 12 and into diffuser chamber 94. Positioned between the radiator body and chamber 94 is a combined air distributing and filter screen 95, the air flowing through this screen and then through the radiator 93 and out through screen 96 into chamber 97 and outlet conduit 98, and thence through conduit 23 to the hot air compartments 24 and 25 of radiators $R^1$ and $R^2$, and also to the compartment 27a of register 27.

The screens 94 and 96 are of a particular design in that they at all times maintain a certain pressure or banking-up action of air in the radiator chamber of the heater and eliminate high vacuum of air passing across radiator. Accordingly, the screen 96 is made more dense or impervious to the passage of air through screen 95 so that air may flow more freely into the radiator chamber than it can be exhausted therefrom, resulting in a lag at this point. This construction leads to a more efficient heating action of the air from the intensifier.

The blower fan is indicated at 99.

It will be noted that the main heater is a closed unit and is placed in the motor adjacent the intensifier. It will also be noted that the pump 16 and blower 99 have a common drive and that both therefore run at the same relative speeds, so that the circulation of water and air is balanced.

Cooling system

The cooling system involves a turbo-compressor-condenser unit preferably driven through fluid pressure by means of a pump operated from the main power plant of the vehicle, a condenser, an evaporator, and a master control unit for loading or unloading the compressor automatically in relation to the needs of the system and regardless of the speed of the car. These units are of a particular design to provide utmost efficiency, are of relative light weight and occupy a minimum of space in or adjacent the car body.

The turbo-compressor condenser unit

As heretofore noted, the pump 35 delivers fluid under pressure, preferably oil, through the line 38 to a turbo-compressor shown more or less in detail in Fig. 18, 18a, 18b and 19. Figs. 20 and 21 show a preferred type of pump 35. This pump comprises a pulley 35a, mounted on a shaft 101, the latter projecting into the pump housing and carrying a gear 102, said gear meshing with a complemental gear 103 mounted on a stub shaft 104 and journaled in suitable bearings in the pump housing. This gear type pump operates in the conventional manner to draw in oil from the reservoir 41 through conduit 41a, and delivers oil under pressure out through conduit 38. The pulley 35a is preferably of cup shape or off-set and is in balanced alignment with its bearing 100 and also with the pulley 37 mounted on the crank shaft of the engine or motor M. The shaft 101 is provided with a seal comprising a packing 105 and a spring-pressed gland 106.

Referring now to Figs. 18, 18a and 18b, the turbo-compressor comprises a compressor housing 107 provided with cooling fins 107a, and in this housing are mounted gears 108, 109 and 110, note Fig. 18a in connection with Fig. 18. The gears 109 and 110 are in mesh with the gear 108 and the latter is secured on a shaft 111 which projects forwardly and has mounted on the end thereof a drive gear 112, the latter in turn meshing with a gear 113 mounted on shaft 114 which projects into the housing 107 and has formed thereon a rotor 115. The compressor chamber is bored off-center or is eccentric with relation to its rotor, the rotor having an oil film bearing against the wall of the housing between the exhaust and intake parts. The rotor 115 is provided with oppositely disposed pairs of reciprocating vanes 116 having tips or end bearing surfaces 116a formed on a radius such as will provide the same bearing surface contact regardless of the inner or outer position of vane throughout its entire rotation. Diametrically opposite vanes are provided with a single spring 116b extending through a transversely drilled hole formed in the rotor shaft, said spring serving to normally retain the vanes in bearing contact with the wall of the rotor housing. This type of vane ensures uniform contact throughout rotation of the blades and reduces vibration and at the same time simplifies lubrication. The refrigeration compression chamber is indicated at 117, refrigerant vapor being sucked into this chamber through conduit 118.

Bolted to one side of the housing 107 (with plate 123 interposed therebetween) by means of bolts 119 is a hollow casting or housing 120 having therein a chamber 121 which serves as a refrigerant lubricating oil reservoir. The casting or housing 102 is shown more or less in detail in Fig. 18b. By referring to this figure in connection with Fig. 18, it will be noted that a chamber 122 is provided separate from the reservoir 121, and the oil pressure line 38 connects with this chamber. The wall of the turbine gear chamber is formed with a pair of transverse diagonally disposed recesses which register with holes in plate 123, the said recesses and holes forming oil-inlet ports 124, 124a opening into chamber 122; and said wall is also formed with another pair of transverse diagonally disposed recesses which register with holes formed through casting 128, plate 131 and casting 126 and terminating in gear case chamber 138, these latter recesses and holes providing oil-exhaust ports, note particularly Figs. 18, 13 and 18a. Oil under pressure from chamber 122 flowing into the turbine gear chamber through intake ports 124 and 124a divides, part of the oil flowing around the gears 109 and 110 and the other part flowing around the gear 108, note the arrows in Fig. 18a. By this means a compound driving action is effected as well as a more uniformly balanced load thrust on the driven shaft 111, providing maximum efficiency for the turbine and also ample power in a relatively small unit.

Gears 112 and 113 are mounted in a casting 126, and this casting together with casting 127 provide gear case chamber 138. Between the housing 107 and casting 126 is bearing plate or housing 128. The shafts 111 and 114 are mounted in bearings 129, 129a, 129b and 130; 130a, 130b, bearings 129 and 130 being mounted in plate 123.

A highly effective seal is provided for the shafts 111 and 114, and since these seals are of duplicate construction with respect to both shafts, a description of one will suffice for both. This seal comprises a central supporting plate 131 which is provided with bolt holes for accommodating bolts 132 and may be formed of brass or other suitable non-corrosive material, holes 133 being formed through the plate to accommodate sealing unit. Spacers 134 are provided and opposite ends of each of these spaces are mounted sealing rings 135 and 135a. Between the seal rings 135 and 135a is a bellows member 136, preferably of brass or other suitable material. The bellows 136 may be made in two parts, one on each side of the plate 131, or may consist of a single bellows suitably secured to said plate, and has seal noses secured to opposite ends thereof. Within the bellows 136 is mounted a spring 137, the latter exerting equal oppositely-directed thrust against the seal noses and through the latter against end rings 135 and 135a. With this type of seal, there is always an equalized thrust on opposite ends of the sealing unit, providing a double-acting seal with an equalized self-contained thrust.

As heretofore noted the exhaust ports 125 and 125a communicate with and exhaust into gear case or chamber 138, plate 131 being formed with holes 139 and 139a. A gasket 140 is disposed between the castings 126 and 127. The exhaust oil flowing into chamber 138 is picked up and serves to lubricate the entire gear train, as well as the fan shaft for the condenser cooling system and which will subsequently be described.

The refrigerant gas from the suction side of the system is admitted into the compression chamber 117 from conduit 118 through intake port 141, the latter communicating with an arcuate port 142 formed in the wall of the compression chamber. The port 142 preferably covers an area of 120° of the annular compression chamber 117, or in other words is gauged to cover the area of the intake stroke of the vanes 116. From the chamber 117, the compressed gas exhausts through port 143, note Fig. 18a, formed through plate 123, into chamber 121, a suitable check valve, not shown, being provided in the port 143. The refrigerant oil reservoir 121 is also provided with a series of baffles 144 and 144a, note particularly Fig. 18b, the refrigerant oil under pressure in finely divided or sprayed form impinging against these baffles and collecting thereon and dropping into chamber 121, and at the same time separating from the refrigerant gas under pressure. Thus the lower half of the chamber 21 is always filled with refrigerant oil while the upper half thereof is filled with refrigerant gas. From chamber 121, the refrigerant gas exhausts through port 143a into primary condenser line 143b.

The refrigerant oil from the reservoir 121 circulates into the compressor chamber 117 through tube 145 which at its inlet end extends well below the normal level of the oil and at its outlet end feeds into a drilled hole or passage 145a which communicates with the shaft holes through which the adjacent vane springs 116b extend, the oil flowing laterally along the base of the vanes 116 and then feeding outwardly through grooves 145b formed in the opposite ends of the vanes and into chamber 117. On the trailing side of each vane, and centrally thereof, an additional oil groove 145c is formed which conducts oil into and saturates the incoming charge of refrigerant gas, to thereby ensure a complete seal and lubrication of the vanes and rotor, the major portion of the lubricant exhausting into chamber 121 with the exhaust charge. The suction action created in the intake portion or side of the compression chamber draws the oil out of groove 145c and facilitates circulation of the refrigerant oil. Pressure created in the upper portion of the refrigerant oil reservoir 121 is primarily responsible for circulation of oil upwardly through tube 145.

The refrigerant gas under pressure leaving chamber 121 through port 143a into line 143b passes into primary condenser coil 146, where it is given a preliminary cooling, and then passes through tube 146a into main condenser 147, note particularly Figs. 13, 14 and 17. A fan 148 is mounted so that it draws air in through the coils of the main condenser 147 and at the same time forces air through the coils of the primary condenser 146, the latter being located at the rear of the fan preferably in the region of the outer extremities of the blades. Fan 148 is mounted on a shaft 148a which projects through the turbo-compressor housing assembly to the rear thereof and has mounted thereon a gear 148b, which meshes with gear 148c formed integral with the gear 112, note Fig. 16 in conjunction with Fig. 18. While it is obvious that the speed of the fan may be varied to suit particular installations, in practice it is preferred to have the R. P. M. of the fan approximately twice that of the turbine shaft 111. The fan 148 has a number of purposes in addition to cooling the primary and main condenser coils and turbine unit, as will be subsequently described.

From the main condenser coil, the refrigerant, now in liquid form, flows through tube or conduit 149 to a reserve tank 150 mounted below the condenser unit. Since the refrigerant at this time is free of lubricating oil, the reserve tank may be of smaller size than in cases where the refrigerant and oil comprise a mixture in the system. In fact, the particular construction and operation of the turbo-compressor-condenser unit whereby the refrigerant oil is separated from the refrigerant in the tank 121 promotes a more efficient condensing action and a material reduction in the size of the respective units without loss of efficiency.

The complete turbo-compressor-condenser unit is preferably mounted in a housing 151 which is open at the front and provided with air outlets 152 and 152a in the bottom thereof. These outlets are arranged so that the air is directed across the respective units in the most efficient manner.

A shield 153 is connected to the bottom of the housing 151 and extends below the air outlets 152, 152a and projects below the floor 151a and is open at its rear end, the floor 151a preferably being the floor of the car body. This shield functions to create a partial vacuum, or set up a suction action in the housing 151, through movement of the car during travel, and expedite circulation of cooling air. While the turbo-compressor-condenser unit in Fig. 1 is shown located adjacent the upper extremity of the car body, it will be understood that in practice it is preferred to locate it adjacent the floor of the car body. A preferred location of the unit is in the rear trunk or body portion of cars having this particular compartment, or any other suitable compartments located at this point and at a point remote from the vehicle motor or power plant. The housing 151 is located so that the open front end thereof opens into the car body, the housing being sealed around the edge portions thereof to exclude all air except that passing through the car body. By this means, the fan 148 also functions to control the circulation of air in the car body. In practice, it is preferred to gauge the unit so that approximately twenty-five per cent of the air in the body is withdrawn through the housing 151 and outwardly through the pan 153. This suction action also creates a vacuum effect in the car body and assists introduction of incoming air through the top manifold 5. Since air flowing into housing 151 is already cooled, it will be seen that it has a marked cooling effect on the condenser units.

The turbine driving fluid or oil, after being exhausted through ports 125 and 125a, flows into oil return sump 154 located at the bottom of the gear case or end plate 127, from which it flows through return conduit 155 into cooling coil 156, note particularly Fig. 15, also located so as to receive the full effect of the cooling action of the fan 148, from which coil the oil flows into return conduit 40 and thence into oil reservoir 41.

*Evaporator unit*

The compressed condensed refrigerant fluid flows from reserve tank 150 through tube or conduit 157 to expansion valve 158 forming part of the evaporator-condenser- unit shown in Figs. 23 to 27 inclusive. This expansion valve 158 is of the thermostatically controlled type and is given a predetermined setting, said valve being provided with the conventional capillary tube 158a and bulb 158b, the bulb preferably being located adjacent the first complete turn of the evaporator coil on the suction side of the evaporator, note particularly Fig. 24. From the expansion valve 158 the refrigerant flows through conduit or tube 159 into intake manifold 160, note Fig. 24, from which it flows into a plurality of evaporator coils 161, where the liquid vaporizes, the gaseous vapor flowing into an exhaust manifold 162 located adjacent the top of the evaporator unit. From manifold 162 the refrigerant vapor flows into coil 163, which is preferably given one complete turn and has the capillary tube 158a located adjacent the completion of the turn. From the coil 163 the vapor flows into tube or conduit 164 which communicates with coil 165. These supplemental coils 163 and 165 insure complete vaporization of the liquid refrigerant and eliminate any tendency toward surging which might be caused due to the car travelling over rough roads and which problem would not ordinarily be present in a stationary type of unit.

From the coil 165, the refrigerant vapor flows back through conduit 118 into the compressor chamber 117 from which point the cycle is repeated.

At the point where the return conduit or tube 118 connects with the compressor housing, it is preferred to mount a shut-off and check valve, not shown, which is used when the unit is dismantled for repairs or other purposes.

The construction of the evaporator unit is such as to obtain a maximum cooling action and also utilize the moisture of condensation to maintain the humidity of the air delivered to the car body. The unit comprises a housing 166 which at one extremity has mounted therein a blower 167 driven by a motor 168. Housing 166 is preferably an integral casting for the evaporator and blower, and may be made from the same pattern as that used for the heater-blower unit. The coils 161 are disposed substantially centrally of the housing 166. Air from the conduit 45 flows into intake diffusion chamber 169 from which it strikes or impinges against screen 170 and then flows through the latter into the evaporator chamber around the coils and out through screen 171. The screens 170 and 171 may be and preferably are of substantially the same type and have the same operation as described in connection with the heater unit in Fig. 12, the screen 170 being of coarser mesh than the screen 171, to thereby insure complete diffusion or distribution of the cooling air throughout the evaporator chamber. This construction also cuts down the cost of the unit, since it has been found that cooling fins 172 with this arrangement may be substantially flat or plain as shown, and not of the corrugated type.

The evaporator is constructed in a manner such as to collect and utilize the moisture of condensation from the evaporator coils. With this in view, the convolutions of the coils are projected outwardly into end chambers 173 and 173a, and in these chambers a suitable medium, such as spun copper or the like non-corrosive material, is inserted. It should be understood that while this medium may have some insulating effect, its purpose is primarily to conduct heat to the coils and to prevent frosting and to conduct the moisture of condensation from the coils and transfer it to a bottom collecting trough or pan 174, note particularly Fig. 24a. The coils 165 and 163 are disposed in a top pan 175 having drain holes 176 in the base thereof so that any moisture of condensation which collects in the pan will drain therethrough and into the main condenser chamber, from which it drains through holes 177 into trough 174. Such draining action from the main chamber takes place generally when the unit is stopped, there being little dripping or draining during operation of the unit, such moisture as may drain being carried through the fins by the suction of the air. When in operation, however, there is a constant drip of moisture from the medium in the end chambers and collection of moisture in trough 174 due to the particular construction of the chambers 173 and 173a, and whereby the medium therein conducts exterior heat through the coils and effects condensation of the water or frost collected thereon and delivers it to the bottom trough 174.

From this trough 174, a certain amount of moisture is being continuously withdrawn through outlet 178 when the unit is in operation due to the suction action set up between the screen 171 and the blower inlet, air entering trough 174 through drain hole 177. Thus the moisture extracted from the air during conditioning or cooling is replaced after the cooling operation. A drain pipe 179 is inserted into the trough 174 and projects upwardly a certain predetermined distance to take care of overflow. The holes 177 may be metered with respect to the outlet 178 so as to effect withdrawal of the proper amount of moisture. The blower blades effect a commingling of the air and moisture during passes therefrom.

Air flows into the evaporator through conduit 45 and exhausts therefrom into conduit 31, note Fig. 23 in conjunction with Fig. 1.

*Master control unit*

The power medium or fluid under pressure for driving the compressor-turbine is provided with a by-pass conduit 180, see Fig. 22, which receives oil from the chamber 122 through by-pass outlet port 180a, note particularly Fig. 18b. Conduit 180 opens into valve port 181 which is controlled by a valve 182. The opening and closing movement of valve 182 is controlled by a system of compound lever mechanism from Sylphon bellows 183 mounted in case or housing 48. Sylphon bellows 183 is responsive to an increase or decrease in pressure in line 47, and the stem of this bellows is encircled by a spring 183a and has connected thereto a rod 184 which projects downwardly through a packing gland 185 through the wall of housing 186. Within this housing 186 is a chamber 187 for the by-pass oil, the latter exhausting from this chamber through port 187a. On the lower end of the rod 184 a lever 188 is pivoted, one end of said lever being pivotally anchored to a bracket bearing 189 while the opposite end thereof is pivotally connected to a link 190 which is secured to the hub or an eccentric 191, the latter being mounted on a bearing shaft 192. Rotatably mounted on the eccentric 191 is a rocker arm 193 which at one end is pivotally connected to a link 194 and at its opposite end is pivotally connected to a link 195, the latter being pivoted on the one end of a lever 196 fulcrumed at an intermediate point on a push rod 197 and at its opposite end being pivotally connected to a stop rod 198 mounted in an adjustable stop 198a. Rocker arm 193 carries a contact member 199 which is adapted to contact a rounded or spherical portion of valve 182. Link 194 is connected to a cup-shaped piston member 200 which rides on the one end of a compression spring 201 in a bore 202, the opposite extremity of said spring projecting into a socket 203 provided with an adjustable stem 203a. A cut-out stop 204 adjustably mounted in the adjacent wall of housing 186 limits the upwardly travel of arm 193. A contact member 205 is secured on arm 193.

Rod 197 is connected to pressure bellows 206 which is loaded by means of a spring 207 gauged to exert a predetermined pressure on the bellows 206 at all times. Bellows 206 communicates through conduit 208 with the refrigerant oil reservoir 121.

Air coil 46 is the conventional air-immersion type and together with conduit 47, bellows head 48 and adjustable bellows 49 are charged with a suitable fluid.

The master control operates as follows:

When the air coil 46 acts to increase or decrease the pressure in tube or conduit 47 due to temperature changes of air in the car body, the pressure is likewise varied in bellows 183, thereby imparting movement to the rod 184. Let us assume that the bellows 183 acts to move rod 184 outwardly, then lever 188 through link 190 rocks the eccentric 191 in a counterclockwise direction as viewed in Fig. 22, thereby through rocker arm 193 moving contact 199 against by-pass valve 182. Spring 201 maintains contact member 205 against stop 204 until contact 199 strikes by-pass valve 182, at which time eccentric 191, continuing rotation, frees contact 205 from stop 204, thereby permitting spring 201 to exert its thrust on the by-pass valve through rocker arm 193. Stated in another way, the outward thrust of spring 201 holds contact 205 against stop 204 until a predetermined pressure has been built up in bellows head 48 sufficient to cause rotation of eccentric 191 until contact between 199 and 182 is made and the compressor turbine started in operation. If pressure continues to build up in said bellows due to rise in temperature in the car body, eccentric 191 is rotated further and at the same time the thrust of spring 201 is proportionally increased, causing increased pressure on valve 182. Spring 201, therefore, is adjustable to maintain a constant drive pressure in the pressure line to the turbine regardless of the pressure pump 35 or, broadly, the speed of the car itself. Stop 204 is adjustable to vary the cut-in or cut-out period of the turbine.

Bellows 206 operating through pressure in the refrigerant oil reservoir is primarily a safety release, since should for any reason the air coil 46 and/or its coacting parts fail to control the pressure in the turbine feed line, pressure will build up in the said reservoir beyond a predetermined point and move rod 197 outwardly against tension of spring 207, and if this outward movement is continued until stop rod 198 seats on stop 198a, contact 199 will be raised through lever 196, link 195 and arm 193. It will be noted that as the air coil causes an increase in pressure due to temperature rise, requiring an increase in condensing pressure, spring 201 exerts increased pressure on rocker arm 193 and spring 207 requires further travel to unload due to added clearance between stop rod 198 and its adjustable seat 198a. Thus a proper operating balance is automatically maintained at all times between the automatic control and the safety release. It will be observed that all adjustments are exteriorly accessible.

The switch 55 is provided with upper and lower contacts 209 and 210 and a central contact spring 211. Contact 209 has connected thereto wire 209a which leads to the ground side of the heater motor, while contact 210 has wire 210a connected thereto which leads to the ground side of the evaporator motor, the central spring having a common wire 211a which may be grounded on the vehicle frame. There is a certain clearance between the central spring 211 and upper and lower contacts 209 and 210, this clearance being gauged to permit a range wherein neither the cooling or heating blower motor is operating, for example 10° on either side of a predetermined normal temperature, say for example 70°. Spring 211 is operatively connected to rod 184. Thus, as the bellows 183 moves the rod 183 inwardly or outwardly, spring 211 will make electrical contact with either 209 or 210 after this 10° range has been covered. Spring 211 should, of course, have sufficient flexibility to meet the entire range of movement of rod 184.

Manual control bellows 49 is in effect a range selector and by adjusting this bellows, the pressure in bellows 183 may be increased or decreased as desired to effect a variation in the cut-in and cut-out periods of the cooling or heating system. By this means, the temperature range may be advanced or retarded to meet the demands of the occupant or occupants of the vehicle.

A rheostat 212 is also provided for controlling the speed of the blower motors and also for completely cutting out these motors. Since only one of said motors is grounded at any one time, one control is sufficient. Wires 212a and 212b connect the rheostat with the heater and evaporator blower motors, respectively.

During the 20° range in which neither the cooling or heating system is operating, there is still in effect a forced circulation of air through the car body due to the suction effect set up through the suction fan at the rear of the car and the overloading action on the overhead intake manifold or register 5. This circulating air flows through the air cleaner and also through the heat intensifier, at which latter point the air is temperated and then follows the regular course through the outlet conduits and into the car body and outwardly through the vacuum fan. Thus, when the air is not sufficiently chilly to call for heat, the car may remain closed and there is still a forced circulation of air through momentum of the car. This also proves an economical factor in that the air may be temperated without utilizing the blower motor for the heater. Thus, regardless of whether or not either system is in operation, an air conditioning action is taking place at all times while the car is in motion.

It will be understood that numerous advantages other than those mentioned herein are inherent in the improved system, and, further, that various changes and modifications in structure may be adopted with respect to the general arrangement of parts and the units which go to make up the system without departing from the scope of the invention as defined by the appended claims.

I claim:

1. In an air conditioning system for motor vehicles, in combination with a vehicle body, a fluid refrigerant compressor-condenser system, fluid pressure means for driving the compressor, by-pass valve mechanism operatively associated with the compressor drive, fluid pressure means responsive to temperature conditions in the vehicle body for automatically actuating said mechanism, a refrigerant oil reservoir, forming part of said compressor-condenser system, a pressure release for said reservoir coordinated with said by-pass valve mechanism and operating as a safety release for said mechanism should said temperature-responsive fluid pressure actuating means fail to function.

2. In an air conditioning system for use with a motor vehicle having a substantially closed vehicle body and means for heating and means for cooling the body together with means for circulating air in heat exchange relation with said heating means or said cooling means, said cooling means including fluid pressure drive means; in combination, means responsive to temperature conditions in the vehicle body for regulating the pressure of the fluid in the drive means, and valve means responsive to fluid pressure in said drive means for automatically directing air in heat exchange relation with either said cooling or heating means.

3. In an air conditioning system for use with a motor vehicle having a substantially closed vehicle body and means for heating and means for cooling the body, said cooling means including a fluid refrigerant turbo-condenser-compressor unit together with an evaporator for cooling air operatively connected to said unit and a fluid pressure system for driving the turbine of the unit; in combination, means responsive to temperature conditions in the vehicle body for regulating the pressure of the fluid in said drive system, a cold air conduit communicating said evaporator unit with the vehicle body and a warm air conduit communicating said heating means with said body, and valve means responsive to fluid pressure in the turbine drive system for automatically directing air circulating in the air conditioning system into either said hot or cold air conduits.

4. In an air conditioning system for use with a motor vehicle having a substantially closed vehicle body and means for heating and means for cooling the body, said cooling means including a turbo-compressor-condenser unit, an evaporator operatively associated with said unit and a pump for circulating fluid under pressure in driving relation with the turbine; in combination, temperature responsive means for regulating the pressure of the fluid circulated by said pump, an air filter unit including a closed filter chamber, means for admitting a predetermined percentage of atmospheric air into the system, a conduit communicating said latter means with said filter chamber, hot and cold air conduits communicating said filter chamber respectively with said evaporator and said air heating means, valve means responsive to fluid pressure in the turbine drive system for automatically directing air from the filter chamber into either said hot or cold air conduits, means for directing air from either of said latter conduits into the vehicle body, and means for withdrawing a predetermined percentage of air from the vehicle body and recirculating the air in heat exchange relation with the evaporator unit or heater.

5. In an air conditioning system for use with a motor vehicle having a substantially closed vehicle body and means for heating and means for cooling the body, together with means for establishing a forced circulation of air through the system, said cooling means including a turbo-compressor-condenser unit, an evaporator operatively associated with said unit and a fluid pressure drive system for driving the turbine of the compressor-condenser unit including a pump arranged to be driven from the vehicle motor; in combination, an air filter including a substantially closed filter chamber, means for admitting a predetermined percentage of atmospheric air into the system, a conduit communicating said latter means with the filter chamber, separate hot and cold air conduits communicating the filter chamber with the evaporator unit and the heating means, a valve for directing air from said filter chamber into either said hot or cold air conduits, means responsive to fluid pressure in the turbine drive system for actuating said valve, and temperature responsive means for regulating the drive of the turbine.

6. In an air conditioning system for use with a motor vehicle having a substantially closed vehicle body and means for heating and means for cooling the body, said cooling means including a compressor-condenser unit, an evaportor, a turbine for driving the compressor, and a fluid pressure system for the turbine provided with a by-pass; in combination, valve means controlling the flow of fluid through said by-pass to thereby regulate the fluid pressure in said drive system, means responsive to temperature conditions within the vehicle body for automatically actuating said valve means, and means responsive to fluid pressure in the turbine drive system for automatically directing the air in heat exchange relation with said evaporator or said heating means.

7. In an air conditioning system for use with a motor vehicle having a substantially closed vehicle body and means for heating and means for cooling the body, together with means for establishing a forced circulation of air through the system, said cooling means including a compressor-condenser unit, an evaporator, a turbine for driving the compressor and a fluid pressure system for driving the turbine; means responsive to temperature conditions in the vehicle body for automatically regulating the drive on the compressor, means responsive to fluid pressure in the turbine drive system for automatically directing the circulating air in heat exchange relation with said evaporator or said heating means, and means operatively associated with said compressor drive regulator for controlling the operation of said forced circulation means.

8. In an air conditioning system for use with a motor vehicle having a substantially closed vehicle body and means for heating and means for cooling the body together with means for establishing a forced circulation of air through the system, said cooling means including a fluid refrigerant compressor-condenser unit, an evaporator, and fluid pressure means for driving the compressor; in combination, separate conduits arranged to conduct the circulating air in heat exchange relation with either said evaporator or said heating means, valve means controlled by fluid pressure in the compressor drive system for automatically directing the circulating air into either the conduit of the heating means or the evaporator conduit, and means also operable by fluid pressure in said drive system for closing off said heating means from the system when said first named valve means operates to direct air into the cold air conduits.

9. In an air conditioning system having heating means and cooling means interconnected for alternate operation to supply heated or cooled air on demand to a compartment to be conditioned, said cooling means including a fluid refrigerant compressor-condenser unit, an evaporator operatively connected to said unit and a fluid pressure turbine for driving the compressor; mechanism operatively associated with the compressor drive for regulating the fluid pressure in the turbine, fluid pressure means responsive to temperature conditions in the compartment for automatically actuating said regulating mechanism, an electric motor operatively associated with the heating means and another electric motor operatively associated with the cooling means whereby air may be circulated in heat exchange relation with either the cooling or heating means and through the compartment, and means operatively associated with said regulating mechanism whereby said motors are caused to remain idle within a predetermined temperature range and are selectively set into operation upon the temperature passing above or below such range.

10. In an air conditioning system having heating means and cooling means interconnected for alternate operation to supply heated or cooled air upon demand to a compartment to be conditioned, said cooling means including a refrigerant compressor-condenser unit, an evaporator operatively connected to said unit and fluid pressure means for driving the compressor; mechanism operatively associated with the compressor drive for regulating the driving pressure of the fluid therein, means responsive to temperature conditions within the compartment for automatically actuating said regulating mechanism, an electric motor operatively associated with the heating means and another electric motor operatively associated with the cooling means whereby air may be circulated in heat exchange relation with either the cooling or heating means and through the compartment, an electric circuit for said motors, and a switch connected into said circuit and operatively associated with said regulating mechanism whereby said motors are caused to remain idle within a predetermined temperature range and are selectively set in operation upon the temperature passing above or below such range.

CLAUDE H. NICKELL.